(12) United States Patent
Kitazume et al.

(10) Patent No.: US 11,377,141 B2
(45) Date of Patent: Jul. 5, 2022

(54) ELECTRIC POWER STEERING DEVICE

(71) Applicant: NSK LTD., Tokyo (JP)

(72) Inventors: Tetsuya Kitazume, Tokyo (JP); Shoya Maruyama, Tokyo (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/260,737

(22) PCT Filed: Dec. 12, 2019

(86) PCT No.: PCT/JP2019/048792
§ 371 (c)(1),
(2) Date: Jan. 15, 2021

(87) PCT Pub. No.: WO2020/122200
PCT Pub. Date: Jun. 18, 2020

(65) Prior Publication Data
US 2021/0245800 A1 Aug. 12, 2021

(30) Foreign Application Priority Data
Dec. 14, 2018 (JP) .............................. JP2018-234462

(51) Int. Cl.
*B62D 3/12* (2006.01)
*B62D 5/04* (2006.01)
*B62D 6/00* (2006.01)

(52) U.S. Cl.
CPC ......... *B62D 5/0463* (2013.01); *B62D 5/0469* (2013.01); *B60Y 2400/307* (2013.01); *B62D 6/00* (2013.01)

(58) Field of Classification Search
CPC ...... B62D 5/0463; B62D 5/0469; B62D 6/00; B60Y 2400/307
See application file for complete search history.

(56) References Cited

U.S. PATENT DOCUMENTS

| 4,727,950 A | 3/1988 | Shimizu et al. |
| 2002/0166319 A1 | 11/2002 | Grebe et al. |

(Continued)

FOREIGN PATENT DOCUMENTS

| JP | 6-004417 B2 | 1/1994 |
| JP | 2007-062584 A | 3/2007 |

(Continued)

OTHER PUBLICATIONS

International Search Report for PCT/JP2019/048792 dated Mar. 10, 2020 (PCT/ISA/210).

(Continued)

*Primary Examiner* — Mathew Franklin Gordon
(74) *Attorney, Agent, or Firm* — Sughrue Mion, PLLC

(57) ABSTRACT

An electric power steering device including: a control rotational displacement calculation unit configured to calculate a control rotational displacement when a steering angle of the steering system is in an angular range from a maximum allowable steering angle for the steering system to a predetermined threshold steering angle; a control steering angle shifting unit configured to calculate the control rotational displacement corrected by a correction amount based on one of the steering torque and rack axial force and a sign of one of the control rotational displacement and the steering angle as a shift control steering angle; and a feedforward control unit configured to output a second current command value based on the shift control steering angle and steering velocity. An assist control is controlled with a third current command value calculated by adding the second current command value to the first current command value.

15 Claims, 25 Drawing Sheets

(56) References Cited

U.S. PATENT DOCUMENTS

| | | | |
|---|---|---|---|
| 2008/0243339 A1* | 10/2008 | Nishimori | B60G 7/003 |
| | | | 701/41 |
| 2009/0114470 A1* | 5/2009 | Shimizu | B62D 5/04 |
| | | | 180/444 |
| 2014/0316658 A1* | 10/2014 | Chai | B62D 6/008 |
| | | | 701/42 |
| 2017/0334481 A1 | 11/2017 | Sakaguchi et al. | |
| 2018/0009472 A1 | 1/2018 | Sawada et al. | |
| 2018/0065660 A1 | 3/2018 | Aoki | |
| 2019/0173406 A1* | 6/2019 | Kouchi | F28D 20/028 |
| 2020/0023899 A1* | 1/2020 | Takahashi | B60Q 9/00 |

FOREIGN PATENT DOCUMENTS

| | | |
|---|---|---|
| JP | 4115156 B2 | 7/2008 |
| JP | 2017-210216 A | 11/2017 |
| JP | 2018-039350 A | 3/2018 |
| WO | 2016/104569 A1 | 6/2016 |
| WO | 2016/125773 A1 | 8/2016 |

OTHER PUBLICATIONS

Written Opinion for PCT/JP2019/048792 dated Mar. 10, 2020 (PCT/ISA/237).

\* cited by examiner

ELECTRIC POWER STEERING DEVICE

CROSS REFERENCE TO RELATED APPLICATIONS

This application is a National Stage of International Application No. PCT/JP2019/048792 filed Dec. 12, 2019, claiming priority based on Japanese Patent Application No. 2018-234462 filed Dec. 14, 2018.

TECHNICAL FIELD

The present invention relates an electric power steering device that calculates a current command value, based on at least steering torque, drives a motor by means of the current command value, and provides a steering system of a vehicle with assist force and, in conjunction therewith, in order to suppress impact and hit sound (abnormal noise) at the time of rack end end-abutting, by reducing the assist force and increasing reaction force, forms a virtual rack end, and, in particular, relates to a high-performance electric power steering device that, by reducing rack end control output (reaction force) in the vicinity of the virtual rack end located before a physical rack end and thereby increasing the assist force, enables a driver to turn the steering wheel to the rack end without stress and does not influence the turning radius of a vehicle.

BACKGROUND ART

Electric power steering devices (EPS) that provide a steering system of a vehicle with assist force, using rotational force of a motor are configured to provide a steering shaft or a rack shaft with drive force of the motor as assist force by means of a transfer mechanism, such as a gear and a belt, via a speed reducer (reduction ratio:N). Such a conventional electric power steering device is configured to perform feedback control of motor current in order to accurately generate torque of the assist force. The feedback control is control for adjusting applied voltage to the motor in such a way that a difference between a current command value and a detected value of motor current decreases, and the adjustment of applied voltage to the motor is generally performed by means of duty cycle adjustment in the pulse width modulation (PWM) control.

A general configuration of an electric power steering device will be described with reference to FIG. 1. In the configuration of the electric power steering device, a column shaft (steering shaft, steering wheel shaft) 2 of a steering wheel 1 is connected to steered wheels 8L and 8R by way of a reduction gear 3 (gear ratio:N), universal joints 4a and 4b, a pinion rack mechanism 5, and tie rods 6a and 6b and further via hub units 7a and 7b. In addition, to the column shaft 2, a torque sensor 10 configured to detect steering torque Th of the steering wheel 1 and a steering angle sensor 14 configured to detect steering angle θ are mounted, and a motor 20 configured to assist steering force of the steering wheel 1 is connected to the column shaft 2 via the reduction gear 3. To a control unit (ECU) 30 configured to control the electric power steering device, power is supplied from a battery 13 and, in conjunction therewith, an ignition key signal is input via an ignition key 11. The control unit 30 performs calculation of a current command value of an assist command, using an assist map, based on steering torque Th detected by the torque sensor 10 and vehicle speed Vs detected by a vehicle speed sensor 12 and controls current to be supplied to the motor 20, based on voltage control value Vref obtained by applying compensation and the like to the calculated current command value.

To the control unit 30, a controller area network (CAN) 40 configured to give and receive various types of information of the vehicle is connected, and the vehicle speed Vs can also be received from the CAN 40. To the control unit 30, a non-CAN 41 configured to give and receive communication other than communication performed through the CAN 40, analog/digital signals, radio waves, or the like can also be connected.

While, in the electric power steering device as described above, the control unit 30 includes a central processing unit (CPU) (including a micro processor unit (MPU) and a micro controller unit (MCU)) as a main component, general functions performed inside the CPU by programs can be described by, for example, a configuration as illustrated in FIG. 2.

Functions and operations of the control unit 30 will be described below with reference to FIG. 2. The steering torque Th from the torque sensor 10 and the vehicle speed Vs from the vehicle speed sensor 12 are input to a basic assist characteristic calculation unit 31 configured to calculate a current command value Iref1 for assist control, and the calculated current command value Iref1 is input to a subtraction unit 32 and is subjected to subtraction of a motor current detected value Im therefrom. Current deviation ΔI (=Iref1−Im) that is a subtraction result by the subtraction unit 32 is controlled by a current control unit 35 configured to perform PI control or the like, voltage control value Vref obtained from the current control is input to a PWM control unit 36 and a duty cycle is calculated therein, and the motor 20 is PWM-driven by a PWM signal via an inverter 37. A motor current value Im of the motor 20 is detected by a motor current detector 38 and input to the subtraction unit 32 and thereby fed back. In the present example, a rotation angle sensor 25, such as a resolver, is connected to the motor 20 and is configured to detect and output a motor rotation angle θm. Note that, by multiplying the motor rotation angle θ by the gear ratio (N) of the reduction gear 3, a steering angle θ can be acquired.

In the electric power steering device as described above, when a large assist torque is added by the motor in the vicinity of a maximum steering angle (rack end) of the steering system, there is a possibility that a large impact occurs and a hit sound (abnormal noise) is generated at a time point when the steering system has reached the maximum steering angle, which causes a driver to feel uncomfortable and to be subjected to stress. Note that, in the description of the present invention, a "rack end" means a state in which a rack, which constitutes the pinion rack mechanism 5, has reached a stroke end, that is, a state in which the steering angle has reached a maximum allowable steering angle or a minimum allowable steering angle for the steering system (in other words, a case where the absolute value of steering angle has reached the maximum allowable value for the steering system).

As such, in JP H6-4417 A (PTL 1), an electrically-driven power steering device is disclosed that includes a steering angle determination means for determining that steering angle of a steering system has reached an angle a predetermined angle before a maximum steering angle and, in conjunction therewith, includes a correction means for reducing assist torque by reducing power to be supplied to a motor when the steering angle has reached the angle a predetermined angle before the maximum steering angle.

In JP 4115156 B (PTL 2), an electric power steering device is disclosed in which, in order to determine whether or not an adjustment mechanism is approaching an end position and, when determining that the adjustment mechanism is approaching the end position, control a driving means in such a way as to reduce steering assistance and determine a velocity at which the adjustment mechanism approaches the end position, determined adjusted velocity is evaluated by a position sensor.

CITATION LIST

Patent Literature

PTL 1: JP H6-4417 B
PTL 2: JP 4115156 B
PTL 3: WO 2016/104569 A
PTL 4: WO 2016/125773 A

SUMMARY OF INVENTION

Technical Problem

However, since the electrically-driven power steering device disclosed in PTL 1 reduces power when the steering angle reaches an angle a predetermined angle before the maximum steering angle and dose not take into consideration steering velocity and the like at all, the electrically-driven power steering device cannot perform fine current reduction control. In addition, PTL 1 does not describe any characteristics in accordance with which assist torque of the motor is reduced, and no specific configuration for achieving the characteristics is not indicated.

The electric power steering device disclosed in PTL 2 is configured to, while reducing assist control amount as the adjustment mechanism approaches an end position, adjust reduction speed of the assist control amount according to velocity at which the adjustment mechanism approaches the end position and sufficiently slow the velocity at the terminal. However, PTL 2 describes only changing characteristics in accordance with which the assist control amount is reduced according to the velocity, and the control is not based on a physical model. In addition, since feedback control is not performed, there is a possibility that intended characteristics cannot be achieved or the control results differently depending on a road surface situation (load condition).

In order to solve the above-described problems, a method using a physical viscoelastic model of a steering system as a reference model is proposed in WO 2016/104569 A (PTL 3), WO 2016/125773 A (PTL 4), and the like by the inventors. A schematic configuration of an electric power steering device in PTLs 3 and 4 is illustrated in FIG. 3, in which a virtual rack end control unit 100 that is configured including a viscoelastic model of a steering system and is configured to take a steering angle θ (or rack axial displacement) as input and output a current command value Iref2 that serves as rack end control output (reaction force) for rack end control is disposed, the current command value Iref2 calculated by the virtual rack end control unit 100 is added to a current command value Iref1 calculated by a basic assist characteristic calculation unit 31 by an addition unit 33, and a current command value Iref3 that is an addition result by the addition unit 33 is input to a subtraction unit 32. Assist control operation at the succeeding stages to the subtraction unit 32 is the same as the operation in the conventional example illustrated in FIG. 2.

The virtual rack end control unit 100 includes an input processing/determination unit 101 configured to take as input and process the steering angle θ (or rack axial displacement), determine whether or not the steering angle θ approaches a rack end, and output rotational displacement that increases from a steering angle at which the virtual rack end control unit 100 starts calculation to a physical rack end as control rotational displacement θr and, in conjunction therewith, output steering velocity ω that is a differential component of the steering angle θ, an end-abutting impact mitigation control unit 150 configured to take the control rotational displacement θr and the steering velocity ω as input and output current command value Ireff in accordance with which feedforward (FF) processing is performed, an output limiter 102 configured to limit a maximum value of the current command value Ireff, and an inverting unit (−1) 103 configured to invert current command value Itefm that has been subjected to the limitation. The end-abutting impact mitigation control unit 150 includes a $k_0$ table 151 configured to calculate a spring constant $k_0$ of the steering system, a μ table 152 configured to calculate a viscosity coefficient μ of the steering system, a multiplication unit 153 configured to multiply the control rotational displacement θr by the spring constant $k_0$, a multiplication unit 154 configured to multiply the steering velocity ω by the viscosity coefficient μ, and an addition unit 155 configured to add the respective multiplication results by the multiplication units 153 and 154 and output the current command value Ireff.

The input processing/determination unit 101 includes a parameter setting unit and the like and takes the steering angle θ as input and outputs the control rotational displacement θr from control start positions and the steering velocity ω, which is a differential component of the steering angle θ. The control rotational displacement θr indicates angular displacement from control start positions (positive and negative) at which rack end processing is started to the physical rack ends and has characteristics of increasing in the positive direction and decreasing in the negative direction according to the steering angle θ, as illustrated in a schematic diagram in FIG. 4.

In other words, the input processing/determination unit 101 calculates a steering angular displacement of the steering angle θ from threshold steering angles as the control rotational displacement θr when the steering angle θ is in an angular range from a maximum allowable steering angle for the steering system to a predetermined threshold steering angle or an angular range from a minimum allowable steering angle for the steering system to another threshold steering angle (in other words, when the absolute value of the steering angle θ is in a range from a maximum allowable value for the steering system to a predetermined threshold value). Note that the input processing/determination unit 101 is an example of a "control rotational displacement calculation unit" described in the claims and the "control start position" is an example of a "threshold steering angle" described in the claims.

Each virtual rack end is set at an angle before one of the physical rack ends, and setting the virtual rack end as close as possible to the physical rack end enables the steering range to be enlarged. The control rotational displacement θr output from the input processing/determination unit 101 is input to the $k_0$ table 151, the μ table 152, and the multiplication unit 153 in the end-abutting impact mitigation control unit 150, and the steering velocity ω is input to the multiplication unit 154 in the end-abutting impact mitigation control unit 150. The $k_0$ table 151 is a data table configured to calculate a spring constant $k_0$ of the steering system and has characteristics that the spring constant $k_0$ comparatively steeply increases (nonlinearly increases) at a middle portion of a change region as the control rotational displacement θr increases, as illustrated in FIG. 5. The μ table 152 is a data table configured to calculate a viscosity coefficient μ of the steering system and has characteristics that the viscosity coefficient μ comparatively gradually increases (nonlinearly increases) over the whole region as the control rotational displacement θr increases, as illustrated in FIG. 6. The spring constant $k_0$ from the $k_0$ table 151 is multiplied by the control rotational displacement θr (i.e. $k_0 \times \theta r$) by the multiplication unit 153 and input to the addition unit 155, the viscosity coefficient μ from the μ table 152 is multiplied by the steering velocity ω (i.e. μ×ω)) by the multiplication unit 154 and input to the addition unit 155, the current command value Ireff that is an addition result ($k_0 \times \theta r + \mu \times \omega$)) by the addition unit 155 is input to the output limiter 102, and the current command value Irefm obtained by limiting a maximum value of the current command value Ireff passes through the inverting unit (−1) 103 and is input to the addition unit 33 in a current control path as rack end control output (reaction force) for correction.

As described above, in the conventional rack end control device, the end-abutting impact mitigation control at a rack end is configured to be a function based on rotational displacement from a steering angle at which the rack end control is started and generates larger output as the rotational displacement increases in such a way as to be able to prevent impact and abnormal noise at the time of end-abutting from occurring. In this case, since, when the output of the end-abutting impact mitigation control is kept at a high level, assist torque of the electric power steering decreases, there is a possibility that the driver cannot turn the steering wheel to a physical rack end and the minimum turning radius of the vehicle decreases.

It is conceivable that, when the steering torque by the driver is sufficiently large even when the steering angle is in the vicinity of the physical rack end, the driver intends to turn the steering wheel to the physical rack end and thereby turn the vehicle at the minimum turning radius. When, on this occasion, the driver turns the steering wheel at a low steering velocity, it is possible to reduce an abnormal noise caused by an impact at the time of end-abutting to a level not causing a sense of discomfort. Since the end-abutting impact mitigation control is configured in such a way that, the larger the rotational displacement is, the larger the output becomes, performing correction in such a way that the absolute value of the rotational displacement input to the end-abutting impact mitigation control decreases enables the output to be reduced and assist torque to be increased. Setting a correction amount in the correction appropriately enables the driver to achieve steering without impact caused by end-abutting even when the steering angle reaches the physical rack end.

The present invention has been made in view of the circumstances as described above, and an object of the present invention is to provide an electric power steering device that, by configuring a rack end control system based on rotational displacement and adjusting rotational displacement input to the rack end control system according to steering torque or self-aligning torque (SAT) (rack axial force) and thereby reducing a control amount in the vicinity of a virtual rack end, enables a driver to turn the steering wheel to a rack end and, in conjunction therewith, does not influence turning radius in vehicle steering.

Solution to Problem

According to an aspect of the present invention, there is provided an electric power steering device performing assist control of a steering system by calculating a first current command value, based on at least steering torque and driving a motor, based on the first current command value, including: a control rotational displacement calculation unit configured to calculate a control rotational displacement when a steering angle of the steering system is in an angular range from a maximum allowable steering angle for the steering system to a predetermined threshold steering angle, the control rotational displacement being a steering angular displacement of the steering angle with the threshold steering angle as a reference; a control steering angle shifting unit configured to calculate the control rotational displacement corrected by a correction amount based on one of the steering torque and rack axial force and a sign of one of the control rotational displacement and the steering angle as a shift control steering angle; and a feedforward control unit configured to output a second current command value based on the shift control steering angle and steering velocity, wherein the electric power steering device calculates a third current command value by adding the second current command value to the first current command value and performs the assist control, using the third current command value.

Advantageous Effects of Invention

The electric power steering device according to the present invention has an advantage that the assist force is increased, and thus the steering can be performed up to the physical rack end or a close distance thereof, and the turning radius of the vehicle steering is not affected, since the rack end control output (reaction force) is reduced in the vicinity of a virtual rack end, even when a control system is constructed based on a physical model, the displacement input to the viscoelastic model is adjusted based on steering torque and SAT, and the end-abutting impact mitigation control unit is provided. In particular, the control steering angle shifting unit is provided with a limiter that limits the shift steering angle amount in a predetermined area, thereby preventing excessive compensation, reducing steering discomfort, and preventing the occurrence of rack-end impact noise.

DESCRIPTION OF EMBODIMENTS

Figure 1:
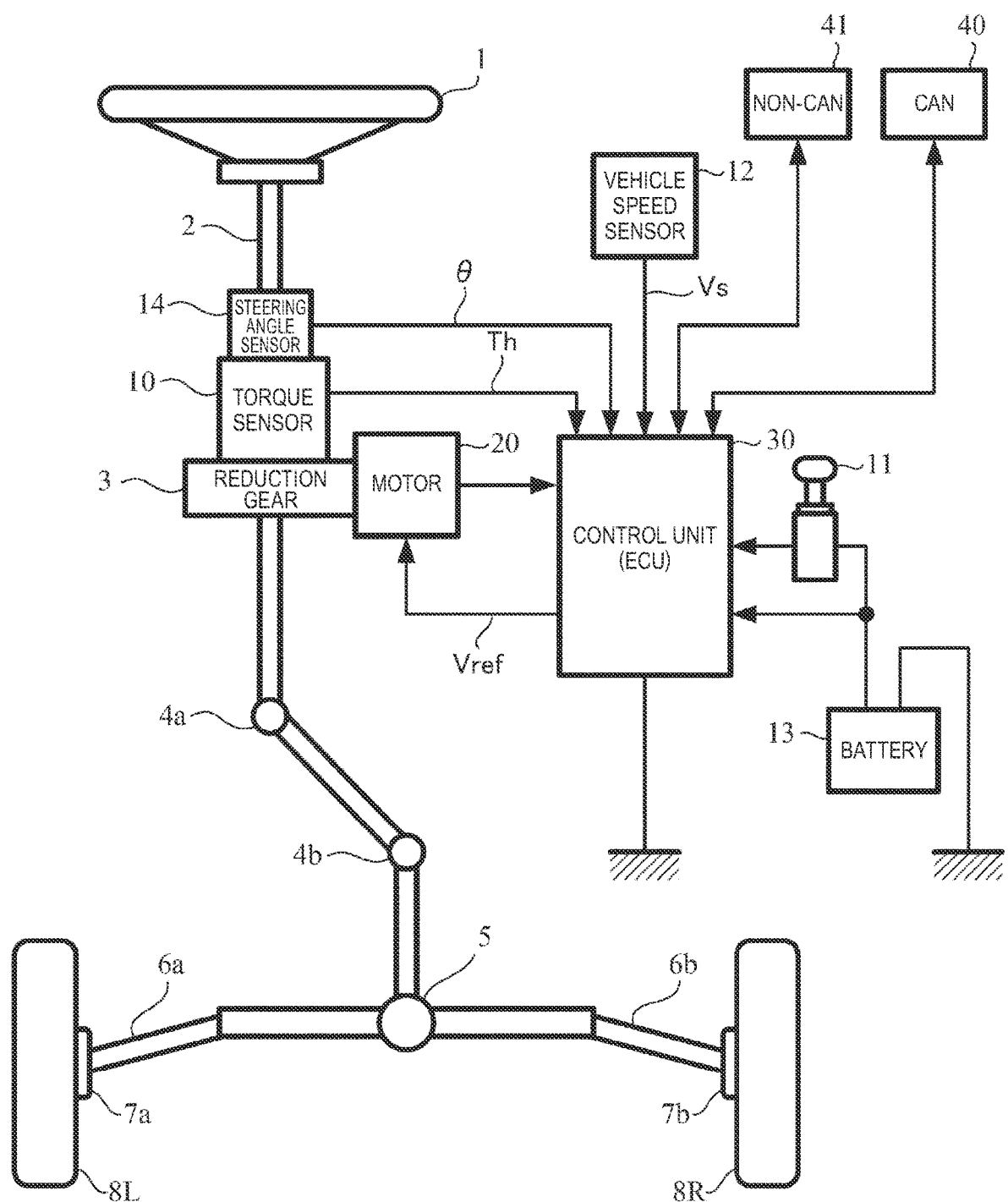
FIG. 1 is a configuration diagram illustrative of an outline of an electric power steering device.
Figure 2:
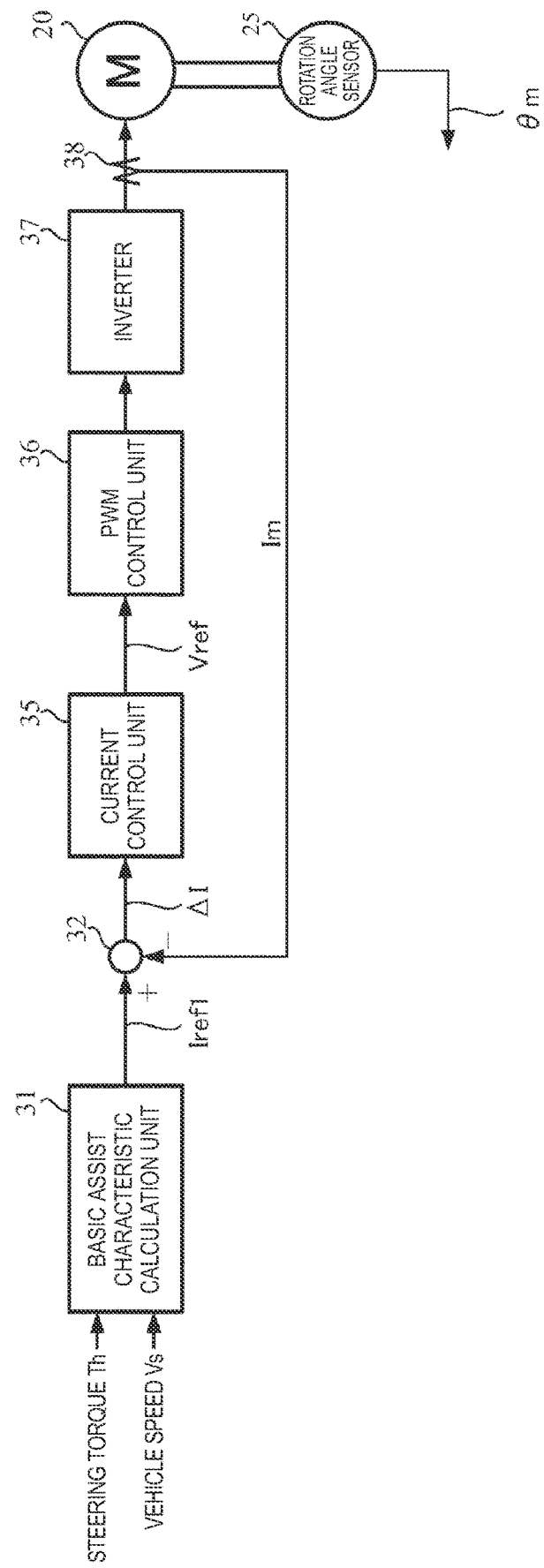
FIG. 2 is a block diagram illustrative of a configuration example of a control system of the electric power steering device.

The present invention relates to control that, in order to suppress impact and abnormal noise at the time of end-abutting at a rack end, generates rack end control output (reaction force) and forms a virtual rack end and, by reducing the rack end control output (reaction force) in the vicinity of the virtual rack end, enables a driver to turn the steering wheel to the rack end without stress and prevents steering control from influencing the turning radius of a vehicle. The present invention, by detecting intention of the driver to further turn the steering wheel while the reaction force has increased, using steering torque, and correcting control rotational displacement to be input to an end-abutting impact mitigation control unit according to the steering torque and steering velocity in such a way that the absolute value of the control rotational displacement decreases and thereby reducing the reaction force, increases assist force and thereby enable the driver to turn the steering wheel to the rack end.

The end-abutting impact mitigation control at a rack end is configured to be a function based on the control rotational displacement from a steering angle at which the rack end control is started and generates larger output as the control rotational displacement increases in such a way as to be able to prevent impact and abnormal noise at the time of end-abutting from occurring. On this occasion, since, when the output of the end-abutting impact mitigation control is kept at a high level, assist torque of an electric power steering decreases, there is a possibility that the driver cannot turn the steering wheel to a physical rack end and the minimum turning radius of the vehicle increases. It is conceivable that, when the steering torque by the driver is sufficiently large even when the steering angle is in the vicinity of the physical rack end, the driver intends to turn the steering wheel to the physical rack end and thereby turn the vehicle at the minimum turning radius. When, on this occasion, the driver turns the steering wheel at a low steering velocity, it is possible to reduce an abnormal noise caused by an impact at the time of end-abutting to a level not causing a sense of discomfort for the driver. Since the end-abutting impact mitigation control unit in the present invention is set in such a way that the larger the control rotational displacement becomes, the larger generated output becomes, performing correction in such away that the absolute value of the control rotational displacement to be input to the end-abutting impact mitigation control unit decreases enables end-abutting impact mitigation control output to be reduced and an assist control amount (assist torque) to be increased. Setting a correction amount appropriately on this occasion enables the driver to achieve steering without impact caused by end-abutting even when the steering angle reaches the physical rack end.

In the present invention, a target steering velocity based on steering torque and a steering angle sign (whether the steering angle is positive or negative) is calculated, and a first rotational displacement correction amount (steering angle for shifting) is calculated by a proportional-integral-differential (PID) controller (or at least one of a proportional controller, an integral controller, and a differential controller) with respect to velocity deviation between the target steering velocity and an actual steering velocity (the A-side in a feedback (FB) form). Since, when the amount of change in the correction amount becomes excessive, impact occurs when the steering angle has reached the physical rack end, a rate limiter for the correction amount is disposed. In addition, a limiter is disposed in a correction amount calculation path lest the absolute value of the correction amount becomes excessive. Further, a second rotational displacement correction amount (steering angle for shifting) is calculated with respect to a steering angle correction amount based on the steering torque and the steering angle sign (whether the steering angle is positive or negative), and, in conjunction therewith, since, when the amount of change in the correction amount becomes excessive, impact occurs when the steering angle has reached the physical rack end, a rate limiter is disposed in a correction amount calculation path (the B-side in a feedforward (FF) form). As with the A-side, a limiter for the correction amount is disposed lest the absolute value of the correction amount becomes excessive.

Subsequently, a rotational displacement correction amount (shift steering angle amount) is calculated by adding the first rotational displacement correction amount to the second rotational displacement correction amount, and the control rotational displacement to be input to the FF control unit including the end-abutting impact mitigation control unit is corrected by the rotational displacement correction amount. By calculating an output (end-abutting impact mitigation current command value) of the end-abutting impact mitigation control, using the corrected control rotational displacement (shift control steering angle), the output is reduced. Since configuring an embodiment in this manner causes the reaction force to decrease and the assist force to be restored, it becomes possible to turn the steering wheel to the physical rack end.

The first rotational displacement correction amount on the FB side (A-side) is calculated according to normalized steering torque that is obtained by multiplying the steering torque by a sign of the control rotational displacement and thereby normalizing the steering torque in such a way that the steering torque is "positive" at the time of the driver further turning the steering wheel and "negative" at the time of the driver returning the steering wheel. A normalized target steering velocity is set in such a way that the larger the normalized steering torque is, the larger the normalized target steering velocity becomes. The normalized target steering velocity is steering velocity that is defined in such a way that the steering velocity at the time of the driver further turning the steering wheel becomes "positive" and the steering velocity at the time of the driver returning the steering wheel becomes "negative", and, when the driver takes his/her hands off the steering wheel (the steering torque is substantially zero), the normalized target steering velocity becomes a negative value because the steering wheel is returned toward the center position because of road surface reaction force. By multiplying the normalized target steering velocity by the sign of the control rotational displacement, the target steering velocity having an actual sign is calculated. By applying at least one of the PID controls to velocity deviation between the calculated target steering velocity and actual steering velocity, a rotational displacement correction amount is calculated. A maximum value of the normalized target steering velocity is set at a value that does not cause impact to occur even when the steering angle reaches a physical rack end.

Regarding the second rotational displacement correction amount on the FF side (B-side), a correction amount is also calculated by multiplying an amount based on the steering torque by the sign of the control rotational displacement. When the control rotational displacement is excessively corrected by the first rotational displacement correction amount and the second rotational displacement correction amount, the corrected control rotational displacement becomes "negative" despite the control rotational displacement being "positive". Since outputting a "negative" value as an output for the end-abutting impact mitigation control while the control rotational displacement is "positive" does not conform to the functional objective of the end-abutting impact mitigation control, a limiter that does not cause the corrected control rotational displacement to become "negative" while the control rotational displacement is "positive" is disposed. The limiter may be disposed for each of the first rotational displacement correction amount and the second rotational displacement correction amount or disposed at the succeeding stage to a stage for adding the first rotational displacement correction amount to the second rotational displacement correction amount.

Embodiments of the present invention will now be described with reference to the drawings. Rack axial force and column shaft torque are equivalent to each other, and the present invention is configured to, by detecting intention of a driver to further turn the steering wheel while the reaction force has increased, using the steering torque or the rack axial force, which is an indication of the intention, and adjusting shift control steering angle to be input to an end-abutting impact mitigation control unit and thereby reducing reaction force, enable the driver to turn the steering wheel to a rack end (or a close range thereof).

Figure 3:
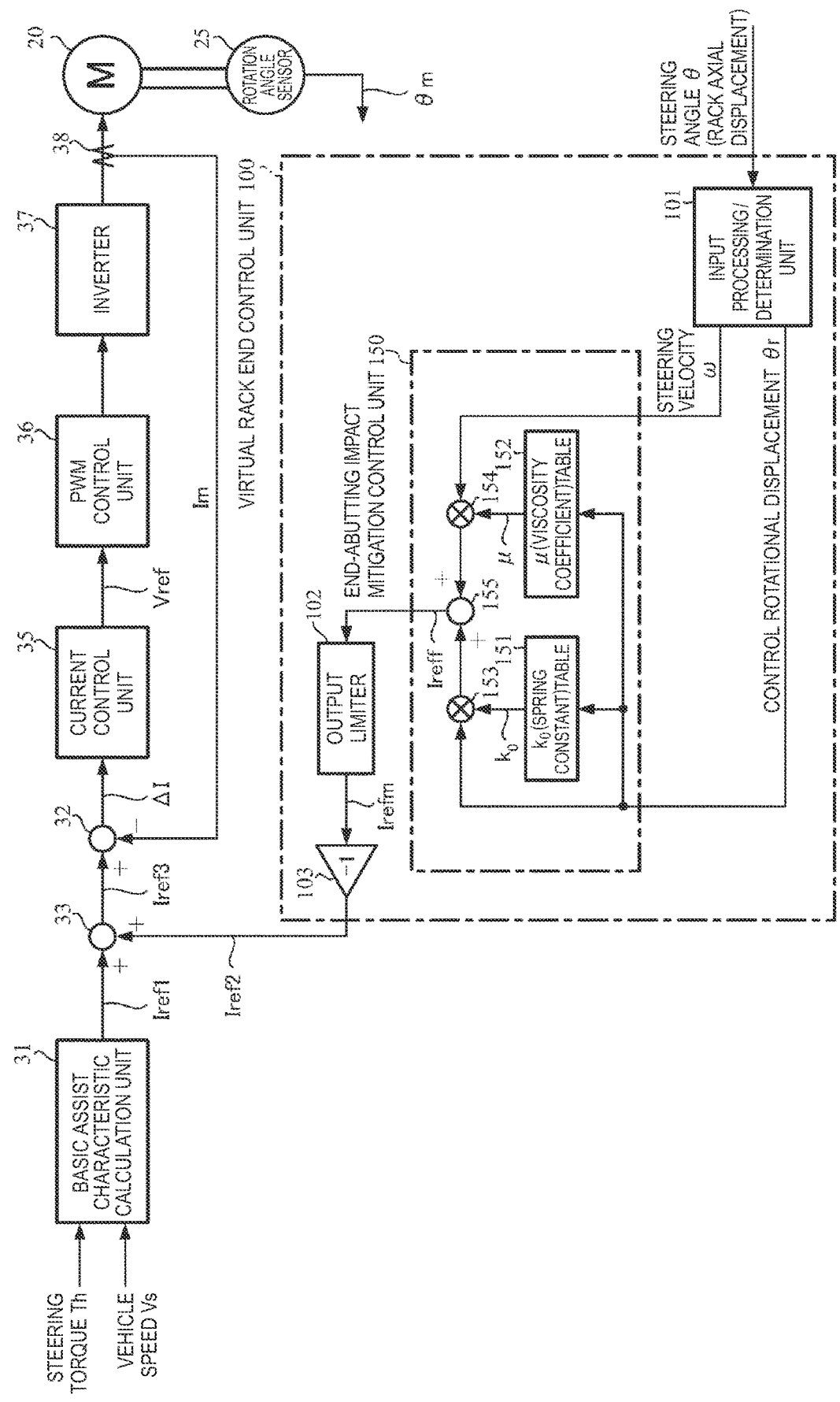
FIG. 3 is a block diagram illustrative of a configuration example of a conventional rack end control based on a viscoelastic model.
Figure 4:
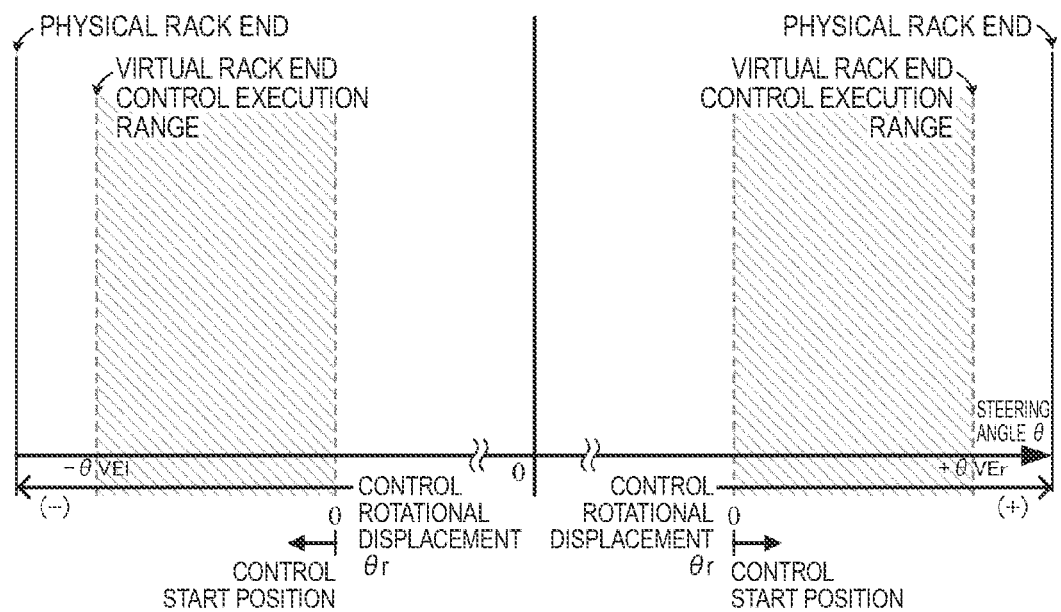
FIG. 4 is a schematic diagram illustrative of a relationship example between steering angle and control rotational displacement in a rack end control.
Figure 5:
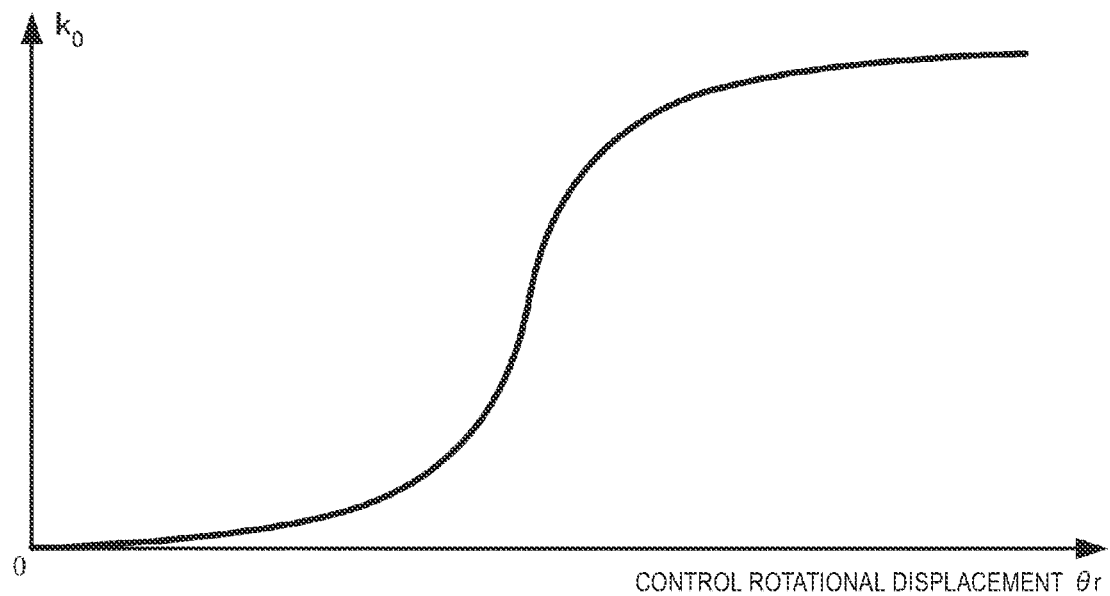
FIG. 5 is a characteristic diagram illustrative of an example of characteristics of a ko (spring constant) table.
Figure 6:
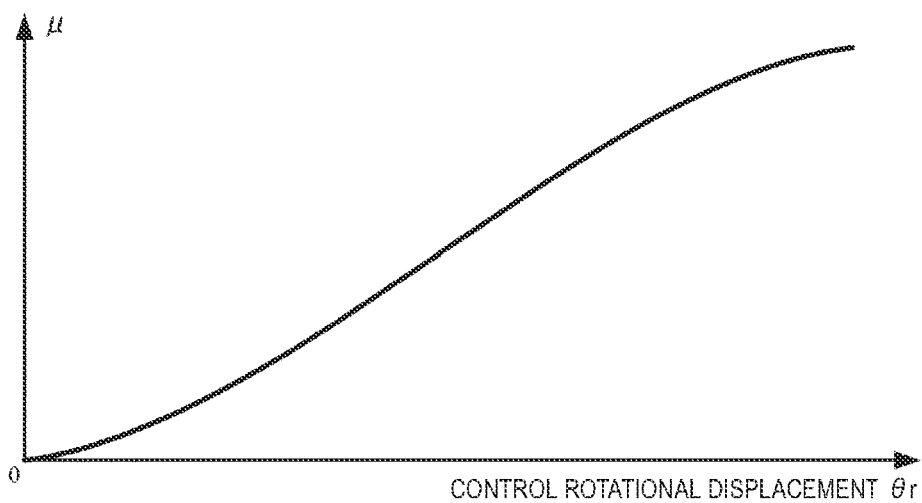
FIG. 6 is a characteristic diagram illustrative of an example of characteristics of a μ (viscosity coefficient) table.
Figure 7:
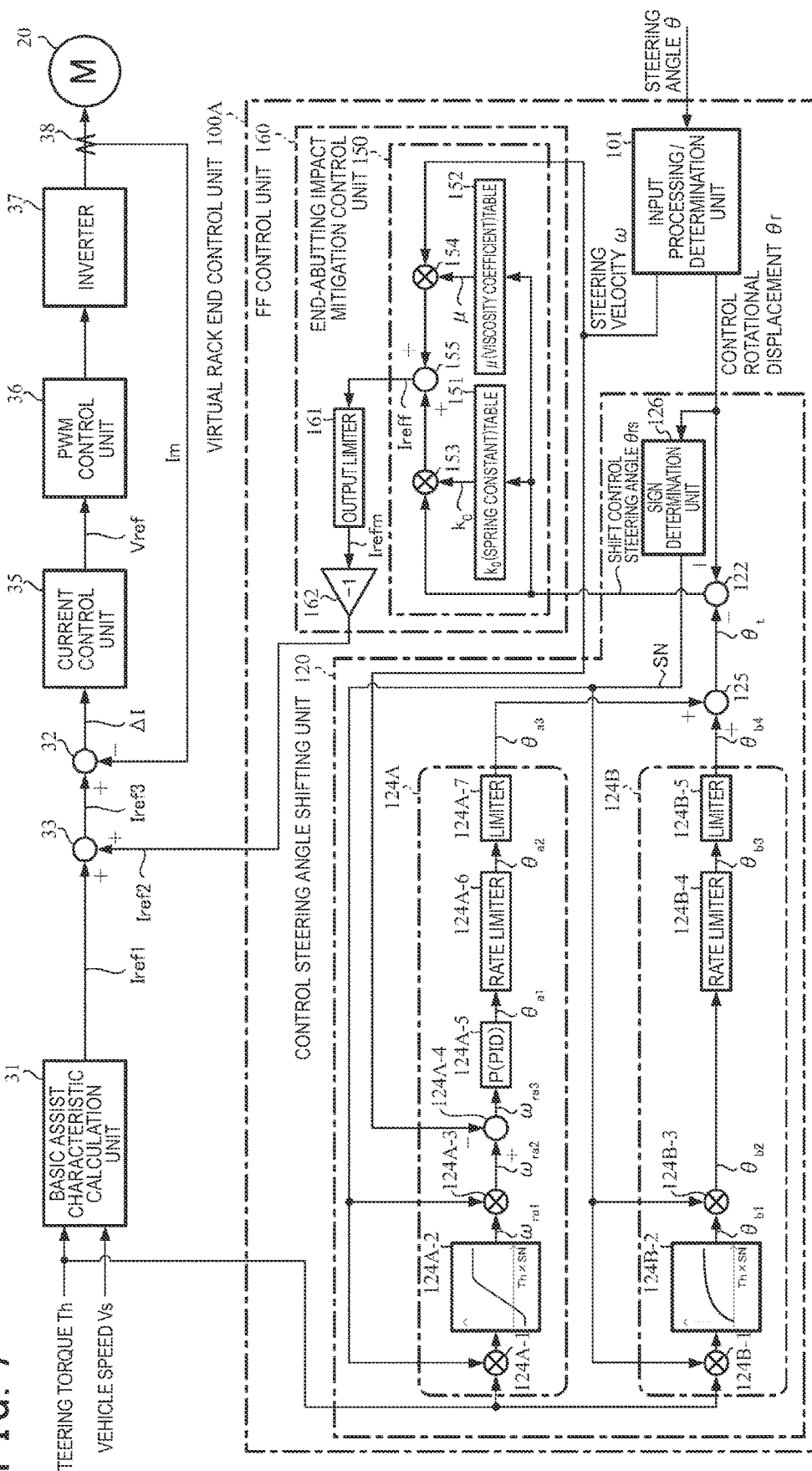
FIG. 7 is a block diagram illustrative of a configuration example (first embodiment) of the present invention.

FIG. 7 illustrates an example of an embodiment (first embodiment) of the present invention in a corresponding manner to FIG. 3, and, in the first embodiment, a virtual rack end control unit 100A that takes steering angle θ and steering torque Th as input and outputs a current command value Iref2 is included, the virtual rack end control unit 100A being constituted by an input processing/determination unit 101 configured to take the steering angle θ as input, determine a rack end, and output control rotational displacement θr and steering velocity ω, a control steering angle shifting unit 120 configured to take the control rotational displacement θr, the steering velocity ω, and the steering torque Th as input and output a shift control steering angle θrs for shift control, and a feedforward (FF) control unit 160 configured to take the steering velocity ω from the input processing/determination unit 101 and the shift control steering angle θrs from the control steering angle shifting unit 120 as input and output a current command value Iref2, the FF control unit 160 being constituted by an end-abutting impact mitigation control unit 150 that is similar to the afore-described end-abutting impact mitigation control unit, an output limiter 161 configured to limit a maximum value of an end-abutting impact mitigation current command value Ireff from the end-abutting impact mitigation control unit 150, and an inverting unit (−) 162 configured to invert a current command value Irefm obtained by limiting a maximum value of the end-abutting impact mitigation current command value Ireff and output the current command value Iref2 for correction. Note that the output limiter 161 and the inverting unit 162 constitute an output control unit.

The control steering angle shifting unit 120 includes a sign determination unit 126 configured to determine whether the control rotational displacement θr is positive or negative and output a sign SN representing a result of the determination and also includes a shifting steering angle calculation unit (A) 124A on the A-side configured to calculate a steering angle $θ_{a3}$ for shifting by means of an FB function, based on the sign SN, the steering torque Th, and the steering velocity ω and a shifting steering angle calculation unit (B) 124B on the B-side configured to calculate a steering angle $θ_{b4}$ for shifting by means of an FF function, based on the sign SN and the steering torque Th. The control steering angle shifting unit 120 further includes an addition unit 125 configured to add the steering angle $θ_{a3}$ for shifting on the A-side to the steering angle $θ_{b4}$ for shifting on the B-side and output a shift steering angle amount $θ_t$ and a subtraction unit 122 configured to subtract the shift steering angle amount $θ_t$ from the control rotational displacement θr and output a shift control steering angle $θ_{rs}$ (=θr−$θ_t$). The addition unit 125 and the subtraction unit 122 constitute a shift control unit. The sign determination unit 126 may be configured to take the steering angle θ as input and output the sign SN.

Figures 8A, 8B:
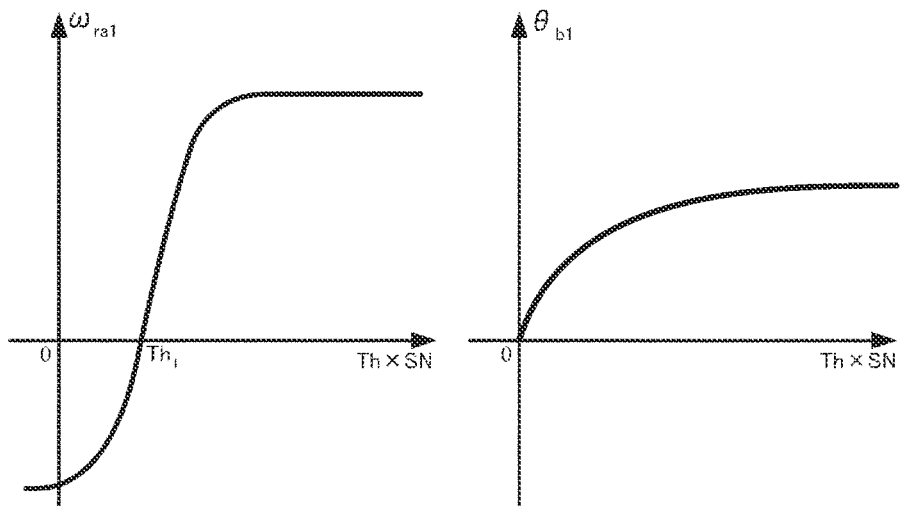
FIGS. 8A and 8B are characteristic diagrams illustrative of examples of characteristics of a steering angular velocity calculation unit and a steering angle correction amount calculation unit, respectively.

The shifting steering angle calculation unit (A) 124A is constituted by a multiplication unit 124A-1 configured to multiply the steering torque Th by the sign SN, a target steering angular velocity calculation unit 124A-2 configured to calculate a target steering angular velocity $\omega_{ra1}$ based on a multiplication result (Th×SN) by the multiplication unit 124A-1 in accordance with characteristics as illustrated in FIG. 8A and output the calculated target steering angular velocity $\omega_{ra1}$, a multiplication unit 124A-3 configured to multiply the target steering angular velocity $\omega_{ra1}$ by the sign SN, a subtraction unit 124A-4 configured to calculate a velocity deviation $\omega_{ra3}$ by subtracting the steering velocity $\omega$ from target steering angular velocity $\omega_{ra2}$ that is a multiplication result ($\omega_{ra1}$×SN) by the multiplication unit 124A-3, a proportional processing unit 124A-5 configured to perform proportional control (may perform at least one of proportional control (P), integral control (I), and differential control (D)) on the velocity deviation $\omega_{ra3}$, a rate limiter 124A-6 configured to perform rate-limiting processing (smoothing) on an angle $\theta_{a1}$ for shift calculation that has been subjected to the proportional control, and a limiter 124A-7 configured to limit a shift amount of an angle $\theta_{a1}$ for shift calculation that has been subjected to the rate-limiting processing by the rate limiter 124A-6 and output the steering angle $\theta_{a3}$ for shifting. The shifting steering angle calculation unit (B) 124B is constituted by a multiplication unit 124B-1 configured to multiply the steering torque Th by the sign SN, a steering angle correction amount calculation unit 124B-2 configured to calculate a steering angle correction amount $\theta_{b1}$ based on a multiplication result (Th×SN) by the multiplication unit 124B-1 in accordance with characteristics as illustrated in FIG. 8B and output the calculated steering angle correction amount $\theta_{b1}$, a multiplication unit 124B-3 configured to multiply the angle $\theta_{b1}$ for shift calculation output from the steering angle correction amount calculation unit 124B-2 by the sign SN and output an angle $\theta_{b2}$ for shift calculation, a rate limiter 124B-4 configured to perform rate-limiting processing (smoothing) on the angle $\theta_{b2}$ for shift calculation output from the multiplication unit 124B-3, and a limiter 124B-5 configured to limit a shift amount of an angle $\theta_{b3}$ for shift calculation that has been subjected to the rate-limiting processing by the rate limiter 124B-4 and output the steering angle $\theta_{b4}$ for shifting. The rate limiter 124A-6 and the rate limiter 124B-4 are not indispensable components.

Note that the target steering angular velocity calculation unit 124A-2 may calculate the target steering angular velocity $\omega_{ra1}$, based on, in place of the multiplication result (Th×SN) of the steering torque Th and the sign SN, a multiplication result of the rack axial force and the sign SN and output the calculated target steering angular velocity $\omega_{ra1}$. In addition, the shifting steering angle calculation unit (B) 124B may calculate the steering angle correction amount $\theta_{b1}$, based on, in place of the multiplication result (Th×SN) of the steering torque Th and the sign SN, a multiplication result of the rack axial force and the sign SN and output the calculated steering angle correction amount $\theta_{b1}$. The same applies to other embodiments.

In the shifting steering angle calculation unit (A) 124A, the target steering angular velocity calculation unit 124A-2 calculates the target steering angular velocity $\omega_{ra1}$, based on the multiplication result of the steering torque Th and the sign SN and outputs the calculated target steering angular velocity $\omega_{ra1}$, the target steering angular velocity $\omega_{ra1}$ is input to the multiplication unit 124A-3 and multiplied by the sign SN, the target steering angular velocity $\omega_{ra2}$ that is a multiplication result is subjected to subtraction of the steering velocity $\omega$ therefrom by the subtraction unit 124A-4 and the velocity deviation $\omega_{ra3}$ is thereby calculated, the velocity deviation $\omega_{ra3}$ passes through the proportional control unit (P) 124A-5 and is thereby converted to the angle $\theta_{a1}$ for shift calculation, the angle $\theta_{a1}$ for shift calculation is input to the rate limiter 124A-6, the angle $\theta_{a2}$ for shift calculation that has been subjected to the rate-limiting processing is further input to the limiter 124A-7, and the steering angle $\theta_{a3}$ for shifting obtained by limiting the shift amount of the angle $\theta_{a2}$ for shift calculation is output. In addition, in the shifting steering angle calculation unit (B) 124B, the steering angle correction amount calculation unit 124B-2 calculates a steering angle correction amount $\theta_{b1}$ based on a multiplication result of the steering torque Th and the sign and outputs the calculated steering angle correction amount $\theta_{b1}$, the steering angle correction amount $\theta_{b1}$ is input to the multiplication unit 124B-3 and multiplied by the sign SN, the angle $\theta_{b2}$ for shift calculation that is a multiplication result is input to the rate limiter 124B-4, the angle $\theta_{b3}$ for shift calculation that has been subjected to the rate-limiting processing is further input to the limiter 124B-5, and the steering angle $\theta_{b4}$ for shifting obtained by limiting the shift amount of the angle $\theta_{b3}$ for shift calculation is output.

Note that the reason for multiplying the steering torque Th by the sign SN of the control rotational displacement $\theta r$ in the shifting steering angle calculation unit (A) 124A and the shifting steering angle calculation unit (B) 124B is because the steering torque Th in the case where the directions of the steering torque Th and the control rotational displacement $\theta r$ coincide with each other (at the time of the driver further turning the steering wheel) is defined to be "positive" and the steering torque Th in the case where the directions of the steering torque Th and the control rotational displacement $\theta r$ do not coincide with each other (at the time of the driver returning the steering wheel) is defined to be "negative". Although the multiplication of the steering torque Th by the sign SN of the control rotational displacement $\theta r$ is performed separately in the shifting steering angle calculation unit (A) 124A and the shifting steering angle calculation unit (B) 124B, a single multiplication unit may be configured to serve as both the multiplication unit of the A-side and the multiplication unit of the B-side.

The rate limiters 124A-6 and 124B-4 have the same configuration and are configured to limit the amounts of change in the angles between control periods and thereby output smooth angles because abrupt changes in the angles cause rapid fluctuation in the control constants and rapid fluctuation in the control outputs. Although the rate limiter 124A-6 will be described below, the same applied to the rate limiter 124B-4.

Figure 9:
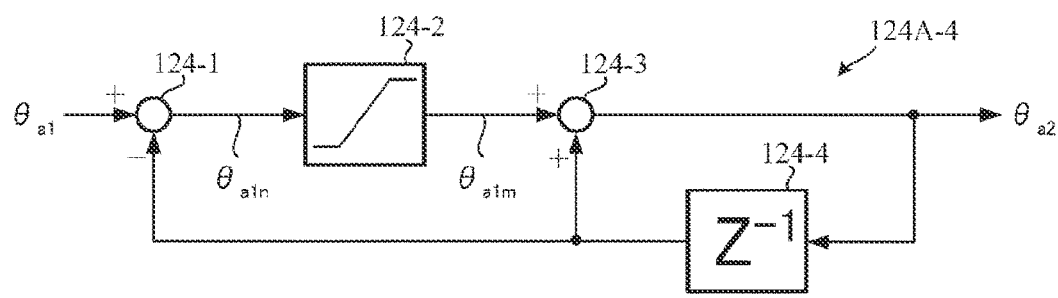
FIG. 9 is a block diagram illustrative of a configuration example of a rate limiter.
Figure 10:
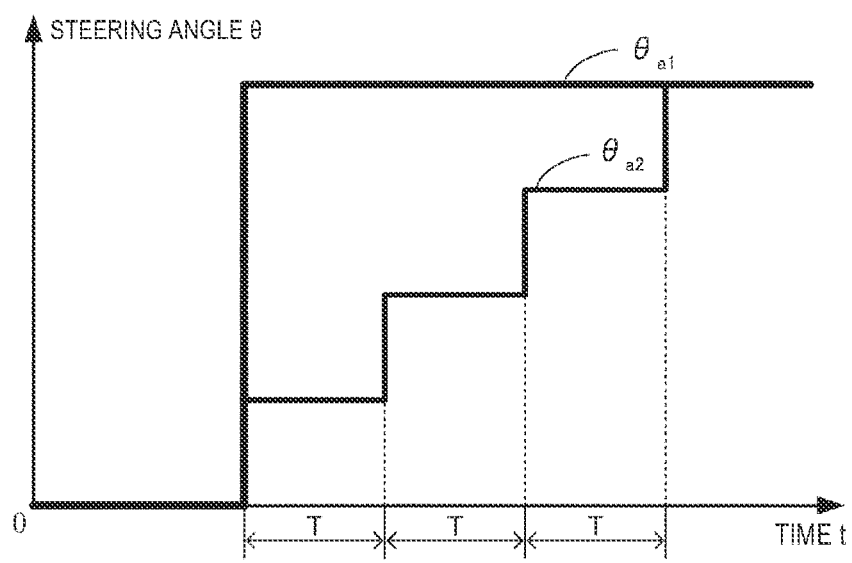
FIG. 10 is a timing diagram illustrative of an operation example of the rate limiter.

The rate limiter 124A-6 is configured such that the angle $\theta_{a1}$ for shift calculation is input to a subtraction unit 124-1 as a positive input and subjected to subtraction of a past value input from a holding unit ($Z^{-1}$) 124-4 therefrom by the subtraction unit 124-1 and an angle $\theta_{a1n}$ that is a subtraction result is limited by an upper limit and a lower limit by a change angle setting unit 124-2 and output as a change angle $\theta_{a1m}$, as illustrated in FIG. 9. The change angle setting unit 124-2 is a unit configure to prevents the change angle from exceeding the upper limit and the lower limit and has characteristics of, by repeating limiting a difference between the input angle $\theta_{a1}$ and a past value by the upper limit and the lower limit and calculating an added value of the limited change angle $\theta_{a1m}$ and the past value and, when the difference $\theta_{a1n}$ is out of range between the upper limit and the lower limit of the change setting unit 124-2, limiting the difference $\omega_{a1n}$ by the upper limit and the lower limit and adding the limited change $\theta_{a1m}$ to the limited past value at every calculation period T, changing the output $\theta_{a2}$ in a staircase pattern as illustrated in FIG. 10 and finally making the output $\theta_{a2}$ coincide with the input angle $\theta_{a1}$ for shift calculation. Since, when a difference between the input (angle) $\theta_{a1}$ and a past value is within a range between the upper limit and the lower limit of the change angle setting unit 124-2, the change $\theta_{a1m}$ that is equal to the difference $\theta_{a1n}$ is output and added to the past value, the output $\theta_{a2}$ consequently coincides with the input (angle) $\theta_{a1}$. As a result of the above-described processing, even when the angle $\theta_{a1}$ for shift calculation rapidly changes, it is possible to make the rapidly changing angle $\theta_{a1}$ for shift calculation change smoothly, which prevents a rapid change in the steering angle (that is, rapid steering).

Figure 11A:
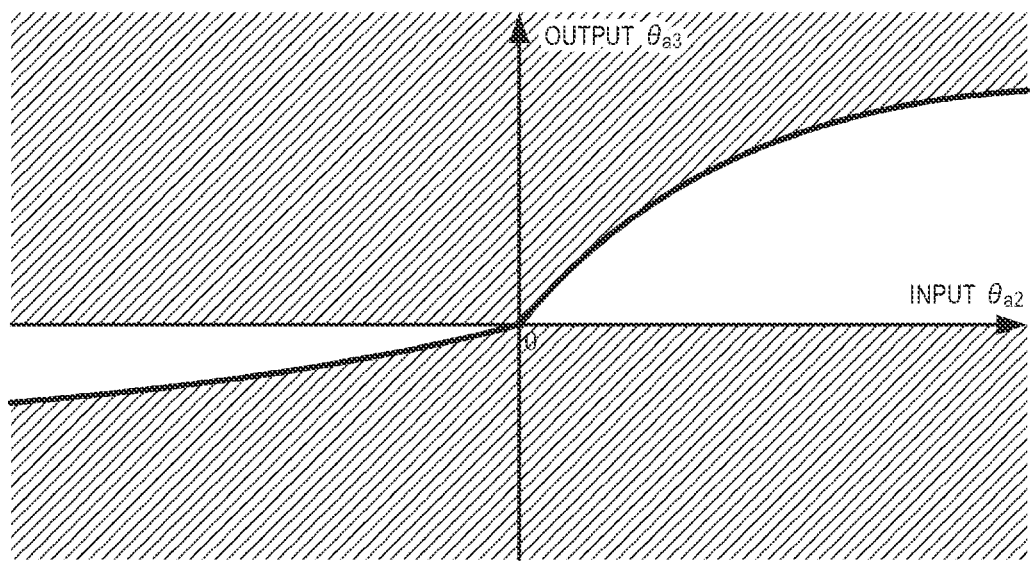
FIGS. 11A and 11B are characteristic diagrams for a description of limiting regions of limiters.
Figure 11B:
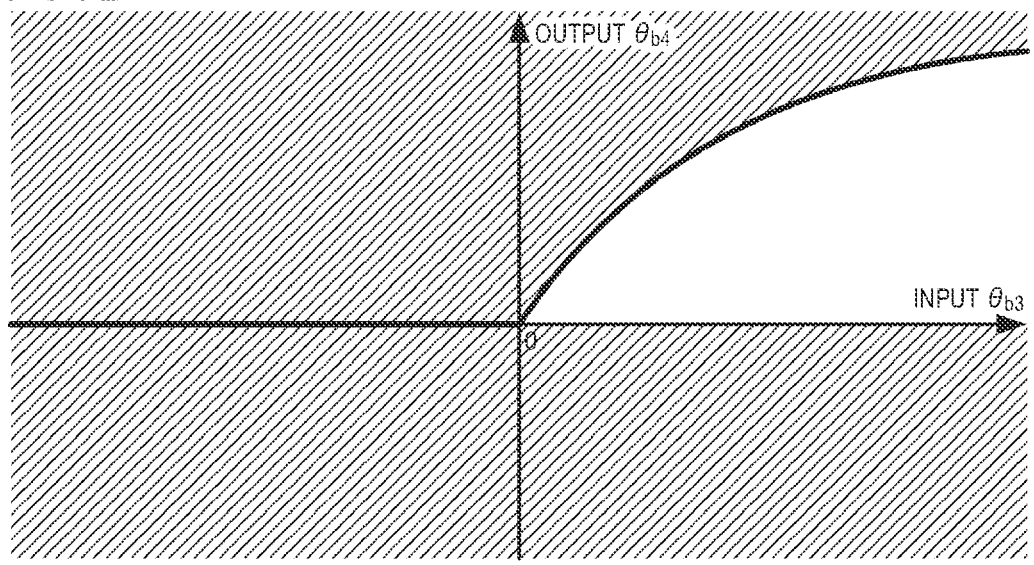

At the succeeding stages to the above-described rate limiters 124A-6 and 124B-4, the limiters 124A-7 and 124B-5, which have characteristics illustrated in FIGS. 11A and 11B, are disposed, respectively. Both the limiters 124A-7 and 124B-5 have a function of limiting a shift amount, and, regarding the limiter 124A-7, the shaded area in FIG. 11A is a region in which an input value is limited and, regarding the limiter 124B-5, the shaded area in FIG. 11B is a region in which an input value is limited. When the control rotational displacement θr is excessively shifted, reaction force is reduced and the steering velocity suddenly increases, which provides the driver with a sense of discomfort. In order to prevent this problem, the shift amounts are limited by the limiters. The limiter 124A-7 has different characteristics between the positive side and the negative side, and larger limit values are set on the positive side than on the negative side. The limiter 124B-5 has limit values set only on the positive side and has characteristics of cutting off all values on the negative side. In other words, when the control rotational displacement θr is positive, the limiter 124A-7 has characteristics of causing the output ($\theta_{a2}$) to constantly have positive values and gradually increase nonlinearly on the positive side of the angle $\theta_{a2}$ for shift calculation ($\theta_{a2}>0$) and to gradually increase in nonlinear characteristics smaller than on the positive side on the negative side of the angle $\theta_{a2}$ for shift calculation ($\theta_{a2}<0$), as illustrated in FIG. 11A. The limiter 124B-5 has characteristics of causing the output ($\theta_{b4}$) to constantly have positive values and gradually increase nonlinearly on the positive side of the angle $\theta_{b3}$ for shift calculation ($\theta_{b3}>0$) and to constantly have "0" on the negative side of the angle $\theta_{b3}$ for shift calculation ($\theta_{b3}<0$), as illustrated in FIG. 11B.

Note that, when the control rotational displacement θr is negative, the characteristics of the limiters 124A-7 and 124B-5 are characteristics obtained by rotating the characteristics in FIGS. 11A and 11B 180° about the origins thereof, respectively.

The steering angle $\theta_{a3}$ for shifting, the shift amount of which has been limited by the limiter 124A-7, from the shifting steering angle calculation unit (A) 124A and the steering angle $\theta_{b4}$ for shifting, the shift amount of which has been limited by the limiter 124B-5, from the shifting steering angle calculation unit (B) 124B are added by the addition unit 125, the shift steering angle amount $\theta_t$ ($=\theta_{a3}+\theta_{b4}$), which is an addition result by the addition unit 125, is input to the subtraction unit 122, the subtraction unit 122 subtracts the shift steering angle amount $\theta_t$ from the control rotational displacement θr and thereby calculates a shifted shift control steering angle θrs, and the shift control steering angle θrs is input to the end-abutting impact mitigation control unit 150 in the FF control unit 160.

Figure 12:
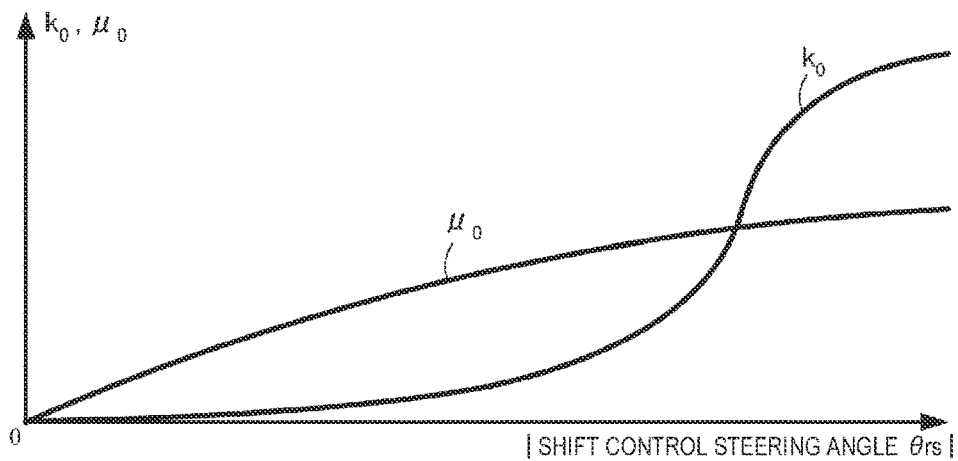
FIG. 12 is a characteristic diagram illustrative of an example of characteristics of a $k_0$ (spring constant) table.

The shift control steering angle θrs is input to a $k_0$ table 151, a μ table 152, and a multiplication unit 153 in the end-abutting impact mitigation control unit 150, and the steering velocity ω is input to a multiplication unit 154 in the end-abutting impact mitigation control unit 150. A spring constant $k_0$ in the $k_0$ table 151 has characteristics represented by an S-shaped gradually increasing curve as illustrated in FIG. 12 and gradually increases as the shift control steering angle θrs increases, and a viscosity coefficient μ in the μ table 152 has characteristics represented by a gentle curve-shaped gradually increasing curve as illustrated in FIG. 12 and gradually increases as the shift control steering angle θrs increases. The spring constant $k_0$ that is output from the $k_0$ table 151 according to the shift control steering angle θrs is multiplied by the shift control steering angle θrs by the multiplication unit 153 and input to an addition unit 155, and the viscosity coefficient μ that is output from the μ table 152 according to the shift control steering angle θrs is multiplied by the steering velocity ω by the multiplication unit 154 and input to the addition unit 155. The end-abutting impact mitigation current command value Ireff that is an addition result by the addition unit 155 passes through a current output unit that is constituted by the output limiter 161 and the inverting unit 162 and is input to an addition unit 33 as the current command value Iref2. A current command value Iref1 is corrected by the addition unit 33, and a corrected current command value Iref3 is input to a subtraction unit 32 as a positive input as a new current command value.

Figure 13:
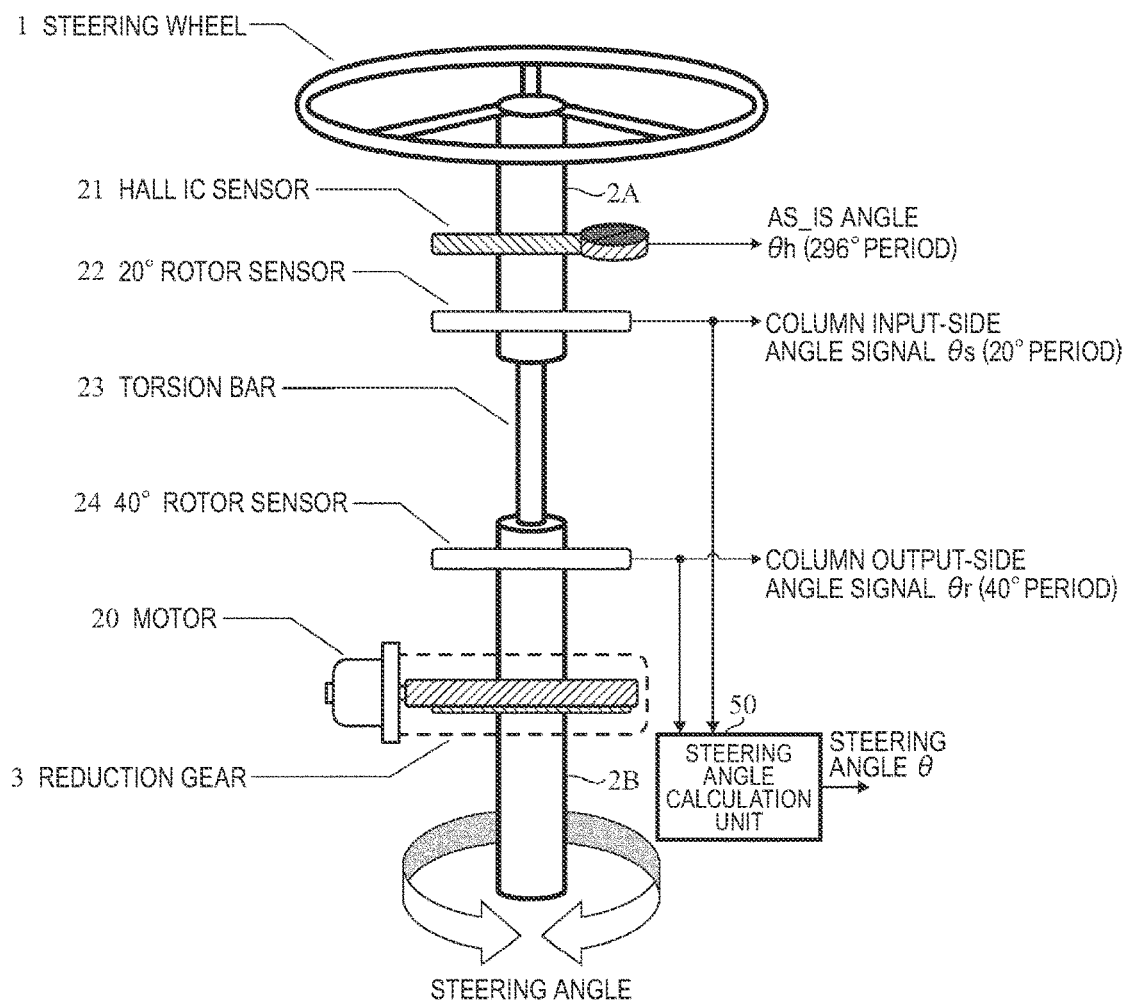
FIG. 13 is a configuration diagram illustrative of a calculation example of an absolute steering angle.

Although the steering angle θ to be input to the virtual rack end control unit 100A can be acquired from a rotation angle sensor 25, the steering angle θ can also be acquired from an angle sensor that has a configuration as illustrated in FIG. 13. On an input shaft 2A on the steering wheel 1 side of a column shaft 2, a Hall IC sensor 21 serving as an angle sensor and a 20° rotor sensor 22 that is an input-side rotor of a torque sensor are mounted. The Hall IC sensor 21 outputs an AS_IS angle θh with a period of 296°. The 20° rotor sensor 22, which is mounted on the steering wheel 1 side of a torsion bar 23, outputs a column input-side angle signal θs with a period of 20°, and the column input-side angle signal θs is input to a steering angle calculation unit 50. In addition, a 40° rotor sensor 24 that is an output-side rotor of the torque sensor is mounted on an output shaft 2B of the column shaft 2, a column output-side angle signal θr is output from the 40° rotor sensor 24, and the column output-side angle signal θr is input to the steering angle calculation unit 50. The column input-side angle signal θs and the column output-side angle signal θr, which are detected in this way, are input to the steering angle calculation unit 50, and the steering angle θ is calculated.

As described thus far, the shifting steering angle calculation unit (A) 124A outputs the steering angle $\theta_{a3}$ for shifting according to the target steering angular velocity $\omega_{ra1}$, and the subtraction unit 122 reduces the impact mitigation current command value Ireff by subtracting the steering angle $\theta_{a3}$ for shifting from the control rotational displacement θr. Therefore, by limiting a condition allowing reduction of the impact mitigation current command value Ireff depending on the steering angular velocity, it is possible to prevent impact sound from being generated at the time of end-abutting caused by reducing the impact mitigation current command value Ireff when the steering angular velocity is large.

In addition, the shifting steering angle calculation unit (B) 124B outputs the steering angle $\theta_{b4}$ for shifting according to the steering angle correction amount based on the steering torque Th, and the subtraction unit 122 reduces the impact mitigation current command value Ireff by subtracting the steering angle $\theta_{b4}$ for shifting from the control rotational displacement θr. Therefore, it becomes possible to reduce the impact mitigation current command value Ireff when the steering torque Th has become large to a certain extent, and it is thus possible to avoid a sudden change in the current command value at the start time of the impact mitigation control and suppress a sense of discomfort.

Note that the control steering angle shifting unit 120 does not necessarily have to include both the shifting steering angle calculation unit (A) 124A and the shifting steering angle calculation unit (B) 124B and may include either thereof. The same applies to other embodiments.

Figure 14:
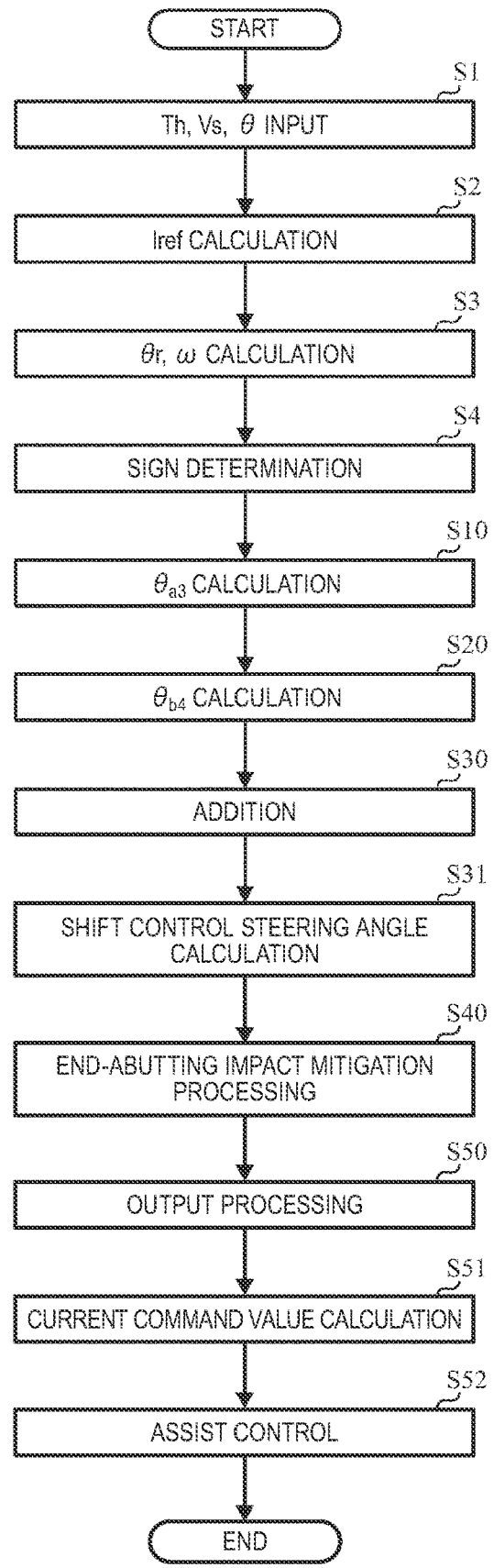
FIG. 14 is a flowchart illustrative of an operation example (the first embodiment) of the present invention.

In the configuration as described above, an operation example thereof (first embodiment) will be described with reference to a flowchart in FIG. 14.

First, steering torque Th, vehicle speed Vs, and steering angle θ are input (step S1), and a current command value Iref1 is calculated in a basic assist characteristic calculation unit 31 (step S2). The input processing/determination unit 101 calculates and outputs a steering velocity ω and a control rotational displacement θr, based on the steering angle θ (step S3). The steering velocity ω is input to the subtraction unit 124A-4 in the control steering angle shifting unit 120 and the multiplication unit 154 in the end-abutting impact mitigation control unit 150, and the control rotational displacement θr is input to the sign determination unit 126 in the control steering angle shifting unit 120 and, in conjunction therewith, input to the subtraction unit 122 as a positive input. The sign determination unit 126 determines a sign (positive or negative) of the control rotational displacement θr and outputs a sign SN (step S4). The sign SN is input to the multiplication unit 124A-1 and the multiplication unit 124A-3 in the shifting steering angle calculation unit (A) 124A and the multiplication unit 124B-1 and the multiplication unit 124B-3 in the shifting steering angle calculation unit (B) 124B.

The steering torque Th is input to the multiplication unit 124A-1 in the shifting steering angle calculation unit 124A and the multiplication unit 124B-1 in the shifting steering angle calculation unit 124B and is multiplied by the sign SN by the multiplication unit 124A-1 and the multiplication unit 124B-1. A multiplication result by the multiplication unit 124A-1 is input to the target steering angular velocity calculation unit 124A-2 in the shifting steering angle calculation unit 124A, a target steering angular velocity $\omega_{ra1}$ is calculated in accordance with characteristics as illustrated in FIG. 8A, and a steering angle $\theta_{a3}$ for shifting on the FB side is calculated in a manner to be described later and output (step S10), and, in conjunction therewith, a multiplication result by the multiplication unit 124B-1 is input to the steering angle correction amount calculation unit 124B-2 in the shifting steering angle calculation unit 124B, a steering angle correction amount $\theta_{b1}$ is calculated in accordance with characteristics as illustrated in FIG. 8B, and a steering angle $\theta_{b4}$ for shifting on the FF side is calculated in a manner to be described later and output (step S20). The steering angle $\theta_{a3}$ for shifting from the shifting steering angle calculation unit 124A and the steering angle $\theta_{b4}$ for shifting from the shifting steering angle calculation unit 124B are input to the addition unit 125 and added (step S30), and a steering angle $\theta_t$ for shifting obtained by the addition is input to subtraction unit 122 as a negative input. The subtraction unit 122 subtracts the steering angle $\theta_t$ for shifting from the control rotational displacement θr and thereby calculates a shift control steering angle θrs (step S31), and the shift control steering angle θrs is input to the end-abutting impact mitigation control unit 150 in the FF control unit 160 and subjected to end-abutting impact mitigation processing, using the steering velocity ω (step S40).

A current command value Ireff that has been subjected to the end-abutting impact mitigation processing has a maximum value thereof limited by the output limiter 161, and a current command value Irefm obtained by limiting a maximum value of the current command value Ireff is inverted (−1) by the inverting unit 162 and input to the addition unit 33 as a current command value Iref2 (step S50). The current command values Iref1 and Iref2 are added by the addition unit 33 and a current command value Iref3 is thereby calculated (step S51), and assist control of the steering system is performed based on the current command value Iref3 (step S52).

Figure 15:
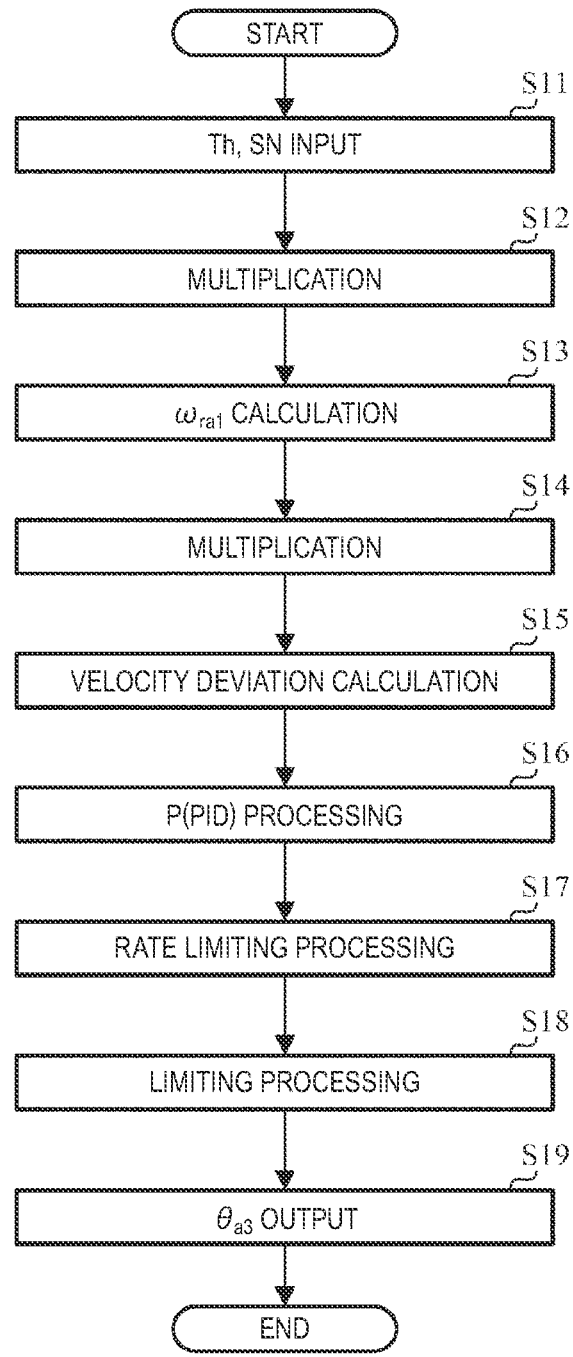
FIG. 15 is a flowchart illustrative of an operation example of a shifting steering angle calculation unit (A)

Next, an operation example of the shifting steering angle calculation unit 124A on the FB side (step S10 in FIG. 14) will be described with reference to a flowchart in FIG. 15.

First, the steering torque Th and the sign SN from the sign determination unit 126 are input to the multiplication unit 124A-1 (step S11), and multiplication of the steering torque Th and the sign SN is performed by the multiplication unit 124A-1 (step S12). A multiplication result by the multiplication unit 124A-1 is input to the target steering angular velocity calculation unit 124A-2 and the target steering angular velocity calculation unit 124A-2 calculates a target steering angular velocity $\omega_{ra1}$ in accordance with characteristics as illustrated in FIG. 8A (step S13), the target steering angular velocity $\omega_{ra1}$ is input to the multiplication unit 124A-3 and multiplied by the sign SN (step S14), and a target steering angular velocity $\omega_{ra2}$ that is a multiplication result is input to the subtraction unit 124A-4 as a positive input and a velocity deviation $\omega_{ra3}$ between the target steering angular velocity $\omega_{ra2}$ and the steering velocity ω is calculated (step S15). The velocity deviation $\omega_{ra3}$ is input to the proportional unit 124A-5 and subjected to the proportional control (step S16), an angle $\theta_{a1}$ for shift calculation that is an output from the the proportional unit 124A-5 is subjected to the rate-limiting processing by the rate limiter 124A-6 (step S17), and an angle $\theta_{a2}$ for shift calculation that has been subjected to the rate-limiting processing is input to the limiter 124A-7 and subjected to the above-described limiting processing (step S18). The steering angle $\theta_{a3}$ for shifting the shift amount of which has been limited is output from the limiter 124A-7 (step S19).

Figure 16:
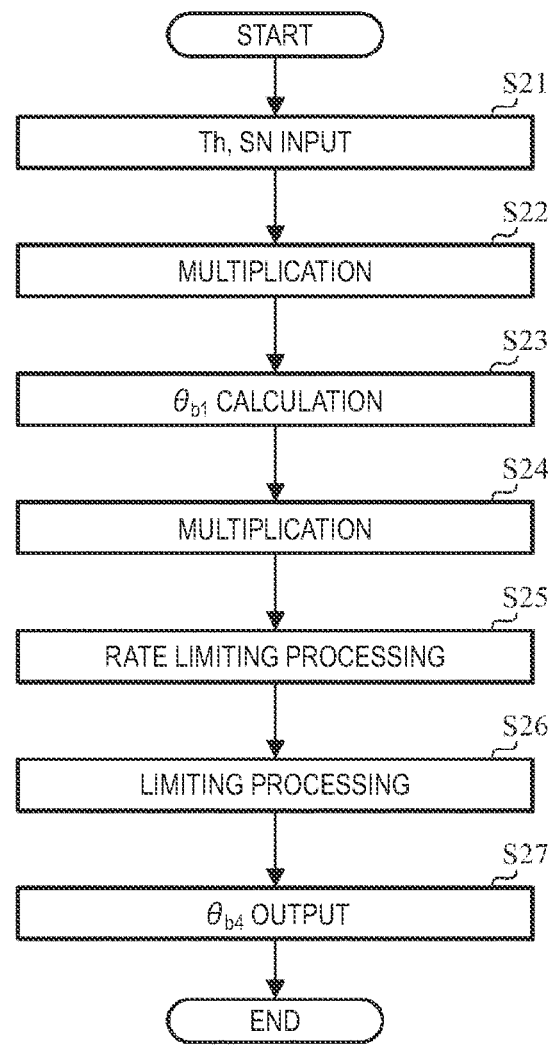
FIG. 16 is a flowchart illustrative of an operation example of a shifting steering angle calculation unit (B)

Succeedingly, an operation example of the shifting steering angle calculation unit 124B on the FF side (step S20 in FIG. 14) will be described with reference to a flowchart in FIG. 16.

First, the steering torque Th and the sign SN from the sign determination unit 126 are input to the multiplication unit 124B-1 (step S21), and multiplication of the steering torque Th and the sign SN is performed by the multiplication unit 124B-1 (step S22). A multiplication result by the multiplication unit 124B-1 is input to the steering angle correction amount calculation unit 124B-2 and the steering angle correction amount calculation unit 124B-2 calculates a steering angle correction amount $\theta_{b1}$ in accordance with characteristics as illustrated in FIG. 8B (step S23), the steering angle correction amount $\theta_{b1}$ is input to the multiplication unit 124B-3 and multiplied by the sign SN (step S24), an angle $\theta_{b2}$ for shift calculation that is a multiplication result is input to the rate limiter 124B-4 and subjected to the rate-limiting processing (step S25), and an angle $\theta_{b3}$ for shift calculation that has been subjected to the rate-limiting processing is input to the limiter 124B-5 and subjected to the above-described limiting processing (step S26). The steering angle $\theta_{b4}$ for shifting the shift amount of which has been limited is output from the limiter 124B-5 (step S27).

Figure 17:
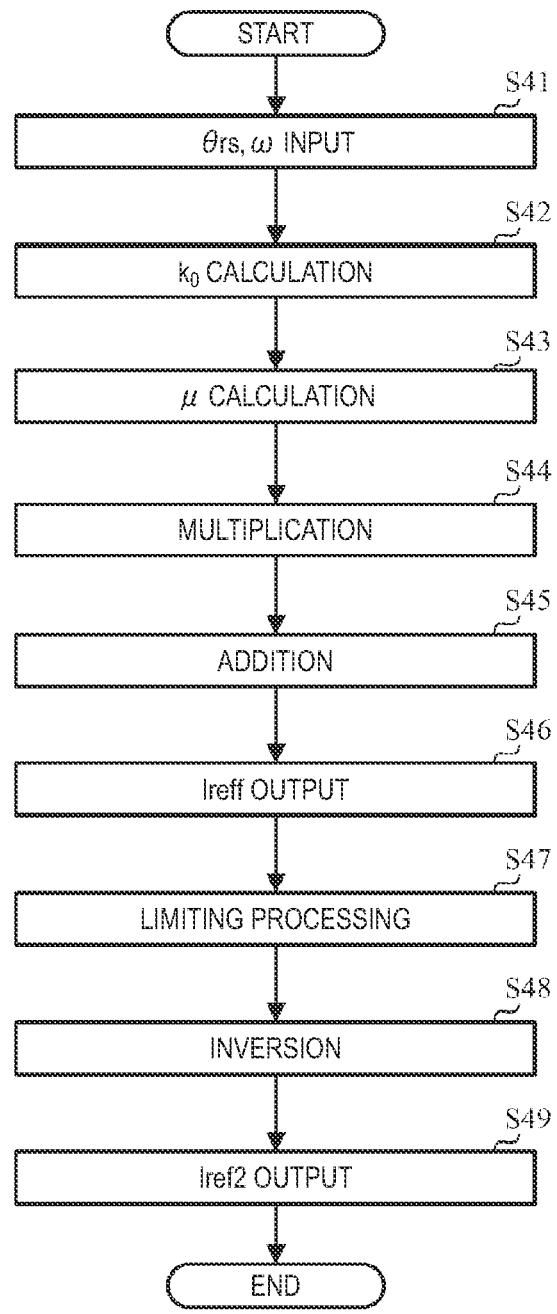
FIG. 17 is a flowchart illustrative of an operation example of a feedforward (FF) control unit.

Next, an operation example of the feedforward (FF) control unit 160 (step S40 in FIG. 14) will be described with reference to a flowchart in FIG. 17.

First, the shift control steering angle θrs is input from the control steering angle shifting unit 120 and, in conjunction therewith, the steering velocity ω is input from the input processing/determination unit 101 (step S41), a spring constant $k_0$ is calculated in the $k_0$ table 151 in accordance with characteristics illustrated in FIG. 12 (step S42), and a viscosity coefficient μ is calculated in the μ table 152 (step S43). The order of the calculation may be reversed. The spring constant $k_0$ is input to the multiplication unit 153 and multiplied by the shift control steering angle θrs, and the viscosity coefficient μ is input to the multiplication unit 154 and multiplied by the steering velocity ω (step S44). The respective multiplication results by the multiplication units 153 and 154 are input to the addition unit 155 and added (step S45), and the addition result is output as the end-abutting impact mitigation current command value Ireff (step S46). The end-abutting impact mitigation current command value Ireff is subjected to the limiting processing by the output limiter 161 (step S47), and the current command value Irefm that has been subjected to the limiting processing is inverted by the inverting unit 162 (step S48) and output as the current command value Iref2 (step S49).

Figure 18:
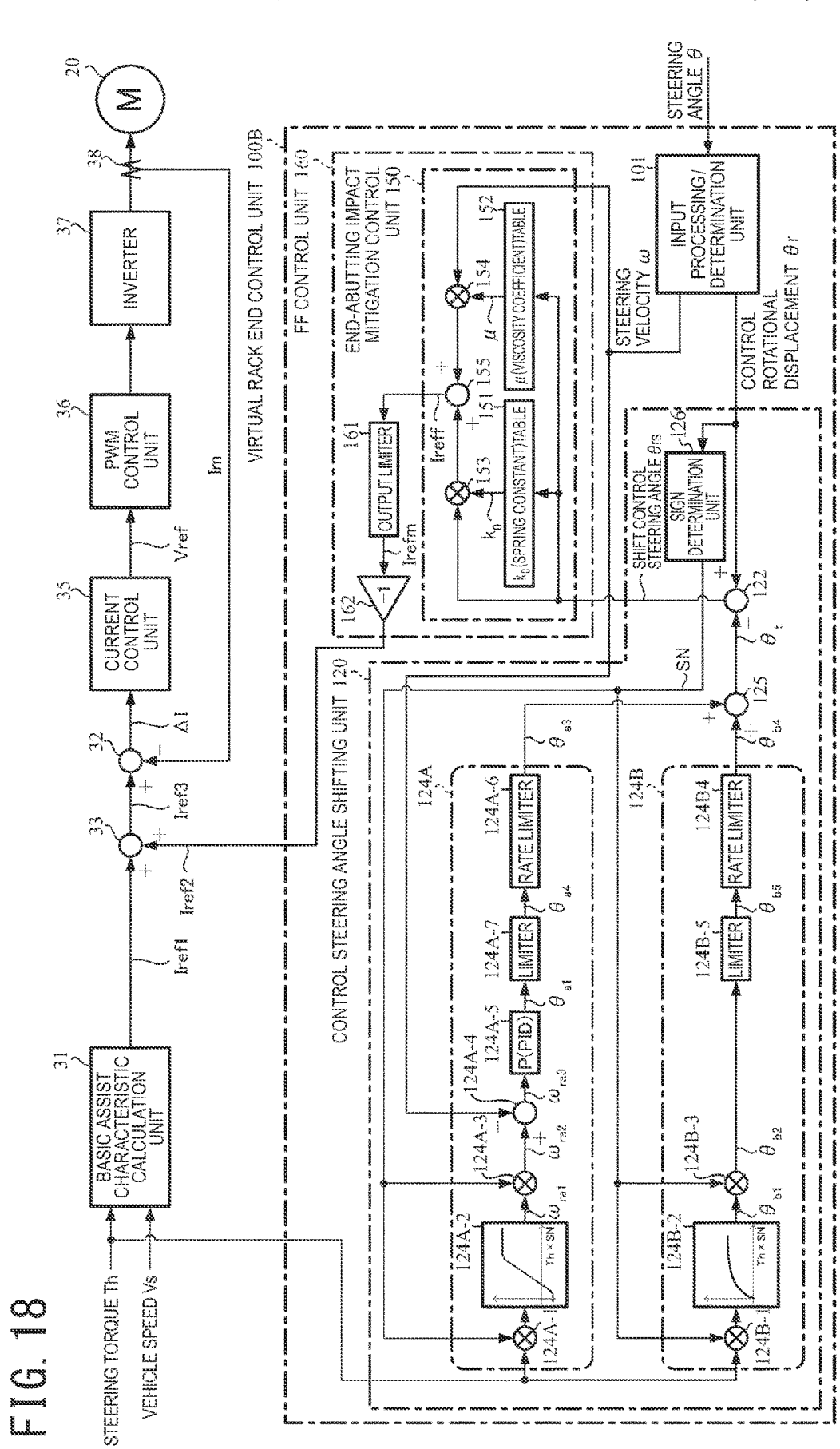
FIG. 18 is a block diagram illustrative of another configuration example (second embodiment) of the present invention.
Figure 19:
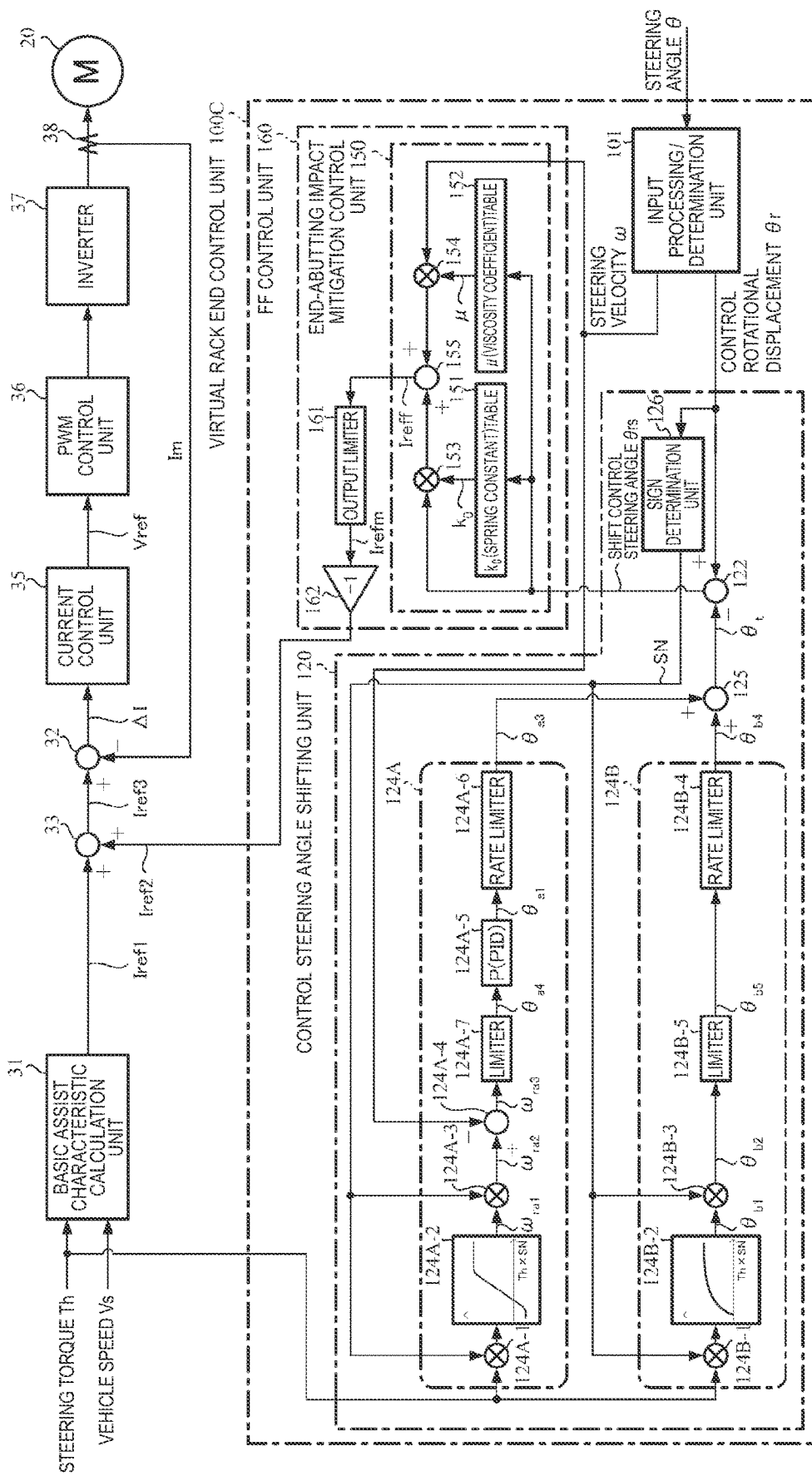
FIG. 19 is a block diagram illustrative of still another configuration example (third embodiment) of the present invention.
Figure 20:
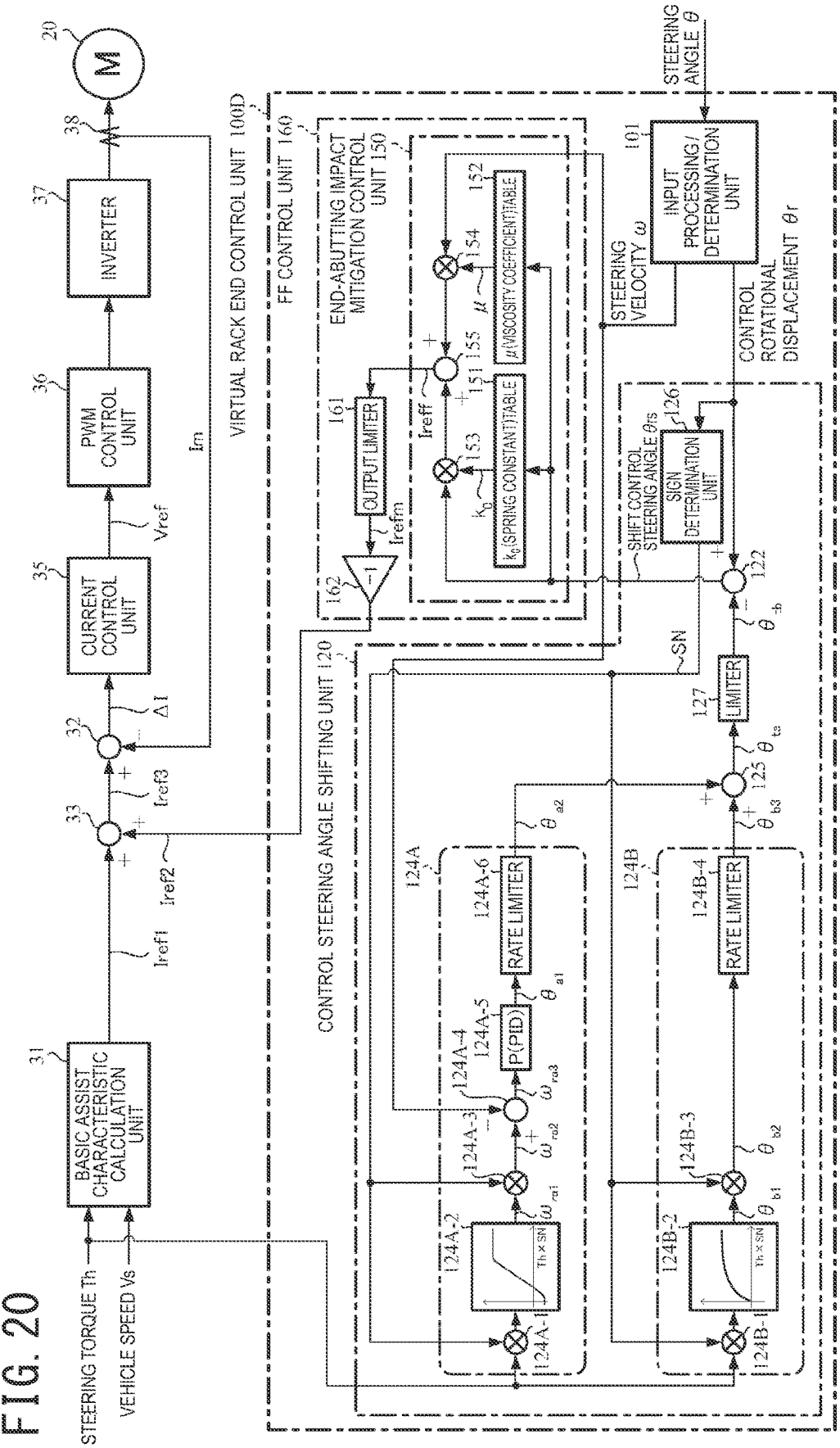
FIG. 20 is a block diagram illustrative of still another configuration example (fourth embodiment) of the present invention.

Although, in the above-described first embodiment, the limiters 124A-7 and 124B-5 for shift amount limitation are disposed at the succeeding stages to the rate limiters 124A-6 and 124B-4, respectively, the limiters 124A-7 and 124B-5 may be disposed at the preceding stages to the rate limiters 124A-6 and 124B-4, respectively, as illustrated in FIG. 18 (second embodiment). In addition, a shifting steering angle calculation unit (A) 124A in the second embodiment illustrated in FIG. 18 may have a limiter 124A-7 arranged at the preceding stage to a proportional control unit 124A-5 and may be configured to limit an angle $θ_{a4}$ for shift calculation that is input to the proportional control unit 124A-5, as illustrated in FIG. 19 (third embodiment). Further, it may be configured such that the limiters 124A-7 and 124B-5 in the shifting steering angle calculation units 124A and 124B in the first embodiment in FIG. 7 are deleted, and, as illustrated in FIG. 20, a steering angle $θ_{a2}$ for shifting from the rate limiter 124A-6 and a steering angle $θ_{b3}$ for shifting from the rate limiter 124B-4 are added by the addition unit 125, a steering angle $θ_{ta}$ for shifting that is obtained by the addition is limited by a limiter 127, and a shift steering angle amount $θ_{tb}$ the shift amount of which is limited is input to the subtraction unit 122 (fourth embodiment).

Figure 21:
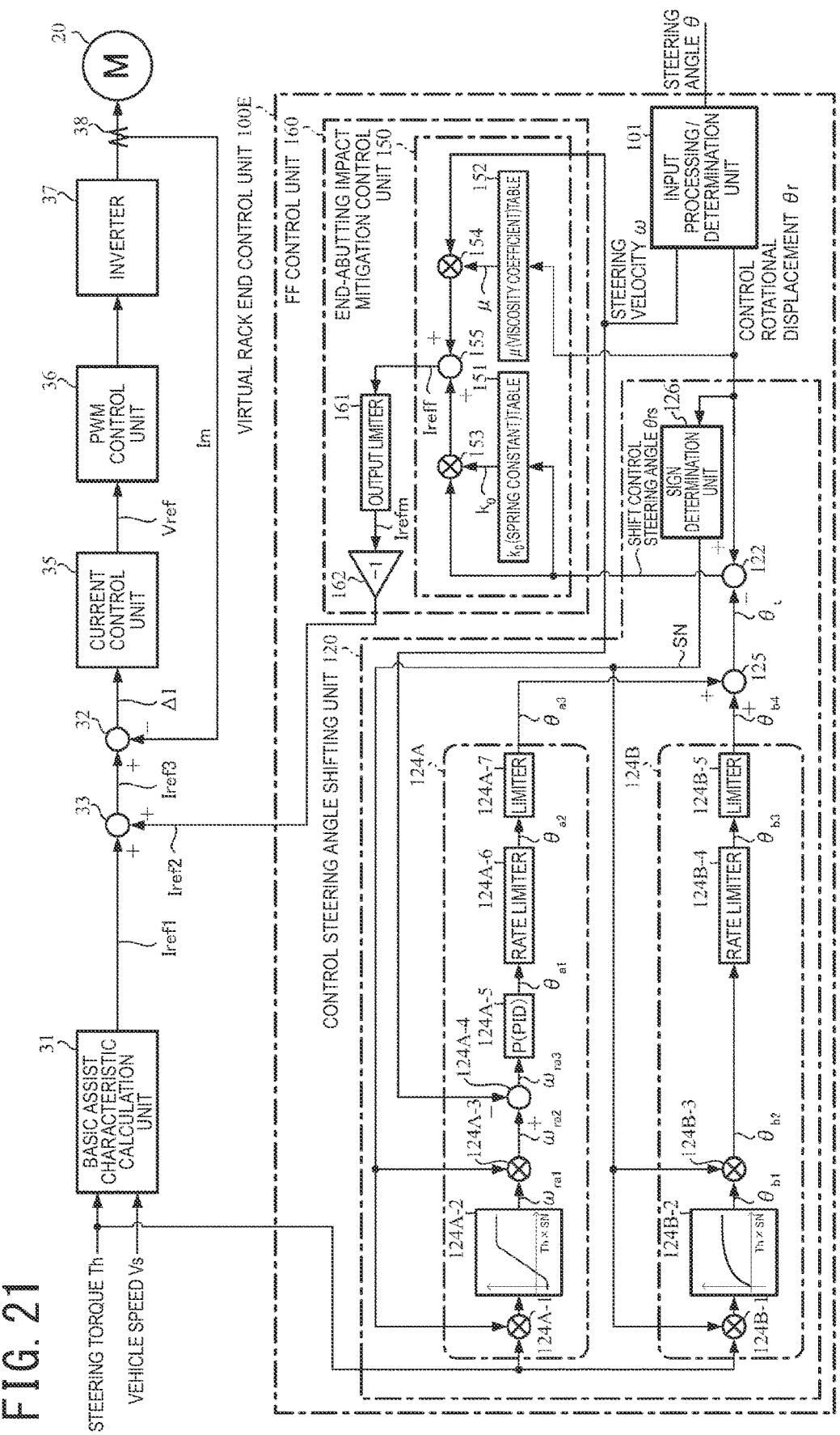
FIG. 21 is a block diagram illustrative of still another configuration example (fifth embodiment) of the present invention.

Although, in each of the above-described first to fourth embodiments, the μ table 152 calculates a viscosity coefficient μ, based on the shift control steering angle θrs, the μ table 152 may be configured to calculate a viscosity coefficient μ, based on the control rotational displacement θr, as illustrated in FIG. 21 in a corresponding manner to FIG. 7 (fifth embodiment). In the fifth embodiment, the arrangement of limiters can also be appropriately changed, as with the second to fourth embodiments.

Although the above-described first to fifth embodiments includes two shifting steering angle calculation units, namely the shifting steering angle calculation unit (A) 124A and the shifting steering angle calculation unit (B) 124B, only the shifting steering angle calculation unit (A) 124A may be included (sixth embodiment) or only the shifting steering angle calculation unit (B) 124B may be included (seventh embodiment). In addition, the first to seventh embodiments can be appropriately combined.

Figure 22:
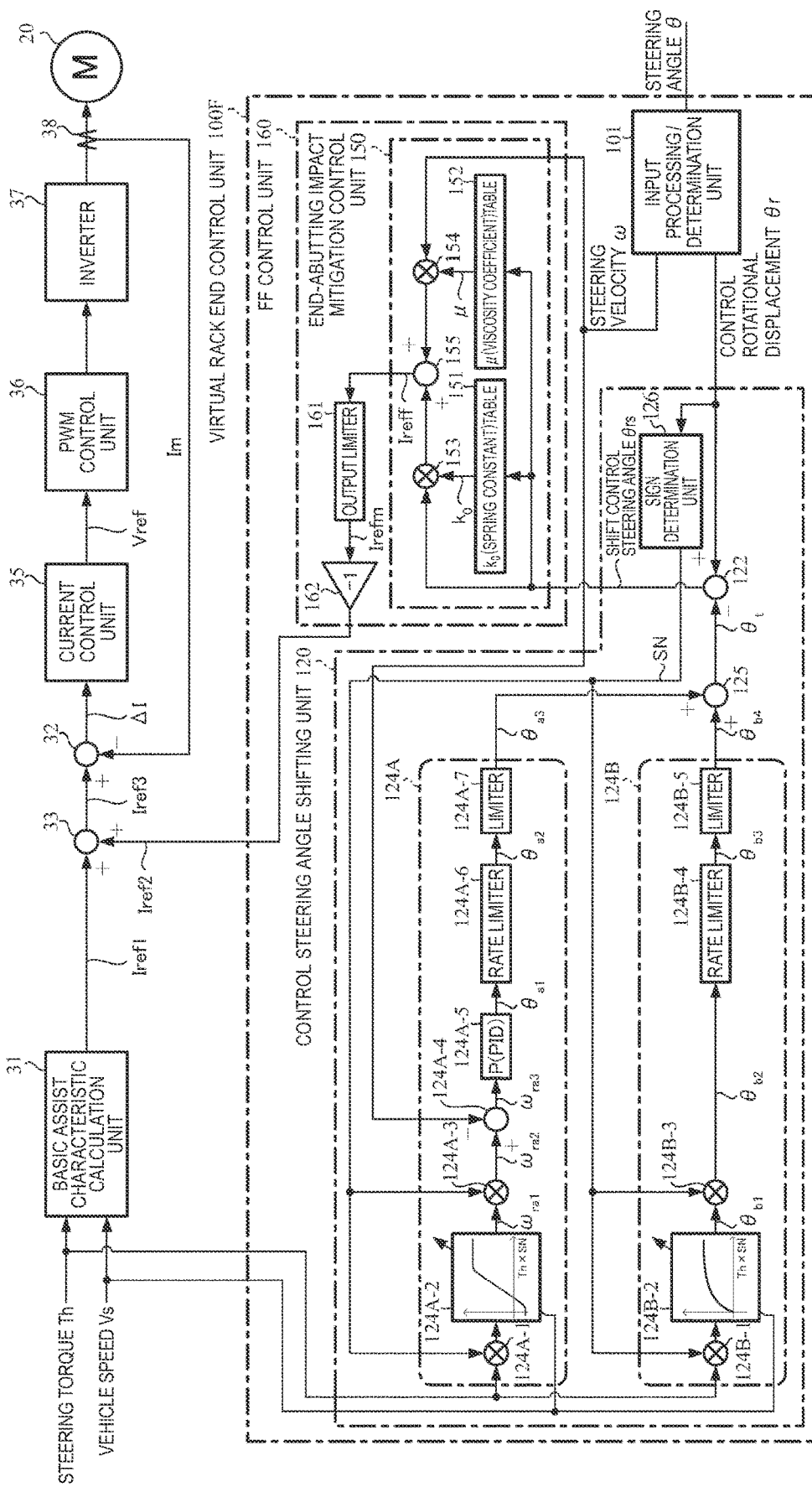
FIG. 22 is a block diagram illustrative of still another configuration example (eighth embodiment) of the present invention.
Figure 23A:
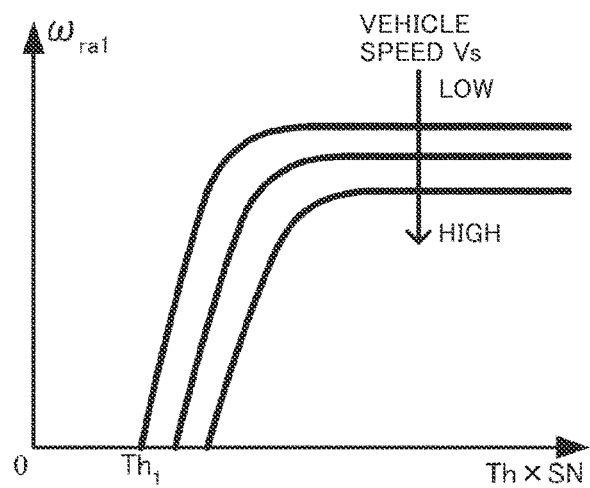
FIGS. 23A and 23B are characteristic diagrams illustrative of examples of characteristics of a steering angular velocity calculation unit and a steering angle correction amount calculation unit, respectively.
Figure 23B:
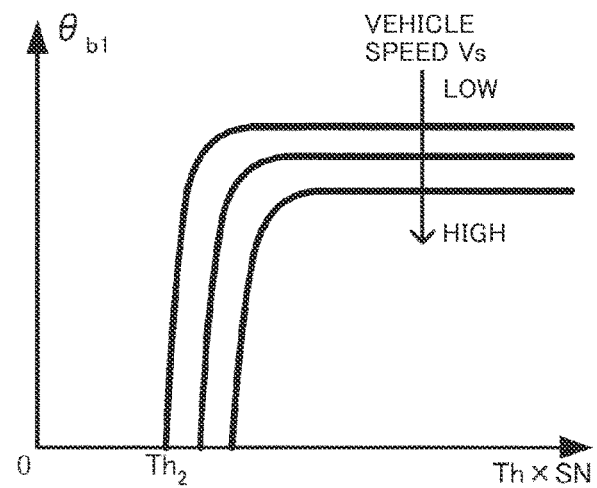

FIG. 22 illustrates an eighth embodiment of the present invention in a corresponding manner to FIG. 7, and, in the eighth embodiment, vehicle speed Vs is input to a target steering angular velocity calculation unit 124A-2 and a steering angle correction amount calculation unit 124B-2 as parameters. The target steering angular velocity calculation unit 124A-2 in the eighth embodiment has characteristics that target steering angular velocity $ω_{ra1}$ decreases as the vehicle speed Vs increases as illustrated in, for example, FIG. 23A, and the steering angle correction amount calculation unit 124B-2 has characteristics that a steering angle correction amount $θ_{b1}$ decreases as the vehicle speed Vs increases as illustrated in, for example, FIG. 23B. Each of the characteristics may be opposite to the above-mentioned with respect to the vehicle speed Vs.

Figure 24:
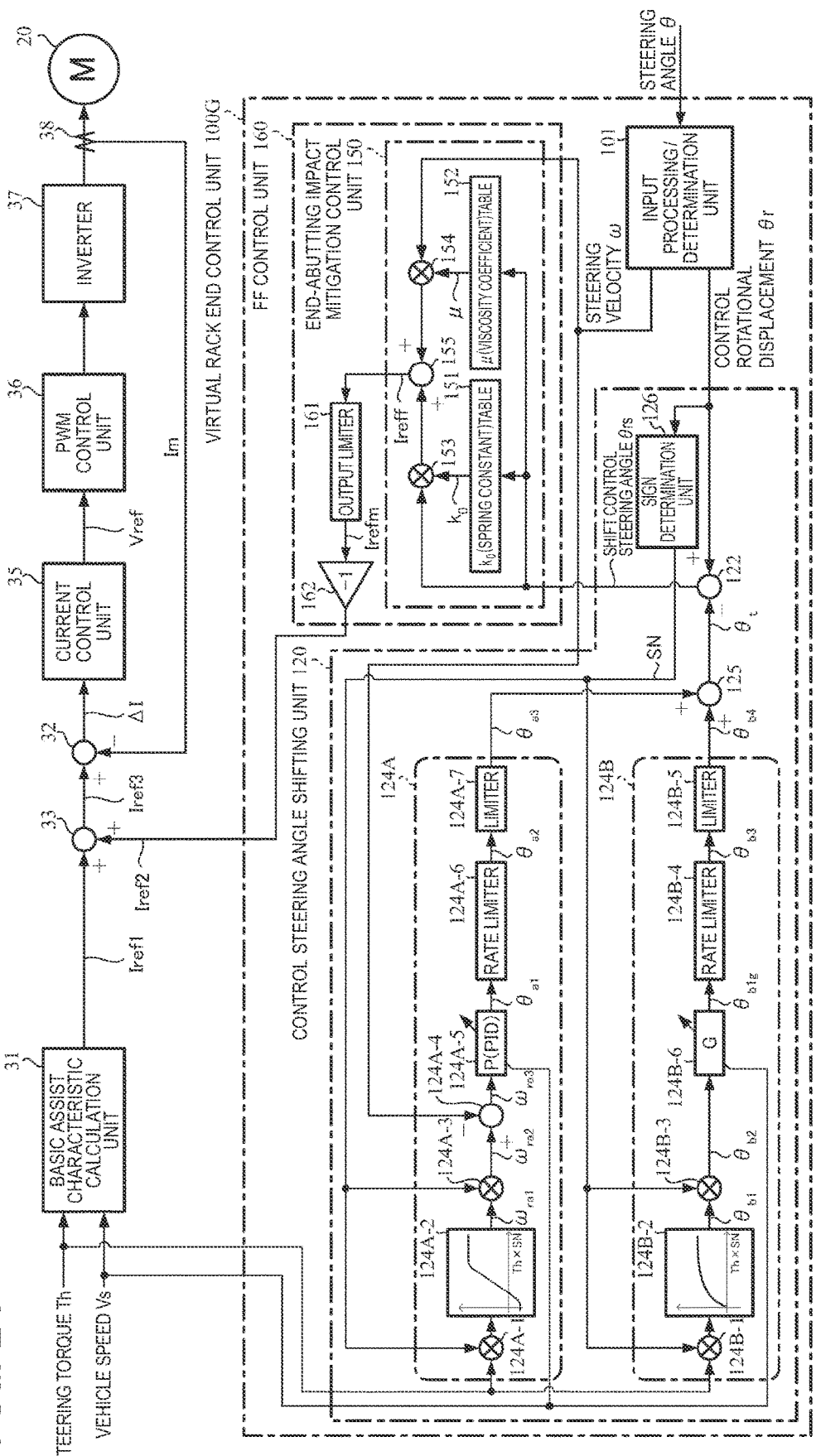
FIG. 24 is a block diagram illustrative of still another configuration example (ninth embodiment) of the present invention.
Figure 25:
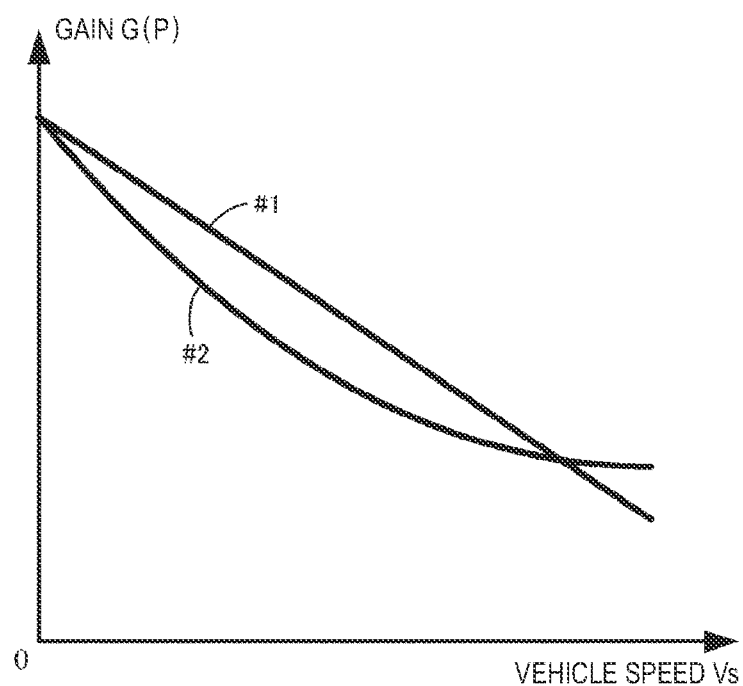
FIG. 25 is a characteristic diagram illustrative of an example of characteristics of a gain unit (proportional (P) control unit)

Although, in the above-described eighth embodiment, the respective output characteristics of the target steering angular velocity calculation unit 124A-2 and the steering angle correction amount calculation unit 124B-2 are configured to respond to the vehicle speed Vs, it may be configured such that, as illustrated in FIG. 24, a gain unit 124B-6 is disposed at the succeeding stage to a multiplication unit 124B-3, that is, at the preceding stage to a rate limiter 124B-4, and a proportional control unit (P) 124A-5 and the gain unit 124B-6 have gains that are variable according to the vehicle speed Vs (ninth embodiment). The gain unit 124B-6 that responds to the vehicle speed Vs has characteristics that, as illustrated in FIG. 25, gain G decreases linearly (#1) or nonlinearly (#2) as the vehicle speed Vs increases. The gain unit 124B-6 may have characteristics that the gain G increases linearly or nonlinearly as the vehicle speed Vs increases. The same applies to the proportional control unit (P) 124A-5, and the proportional control unit (P) 124A-5 has characteristics that the gain thereof responds to the vehicle speed Vs. In the ninth embodiment, the arrangement of limiters can also be appropriately changed.

Figure 26:
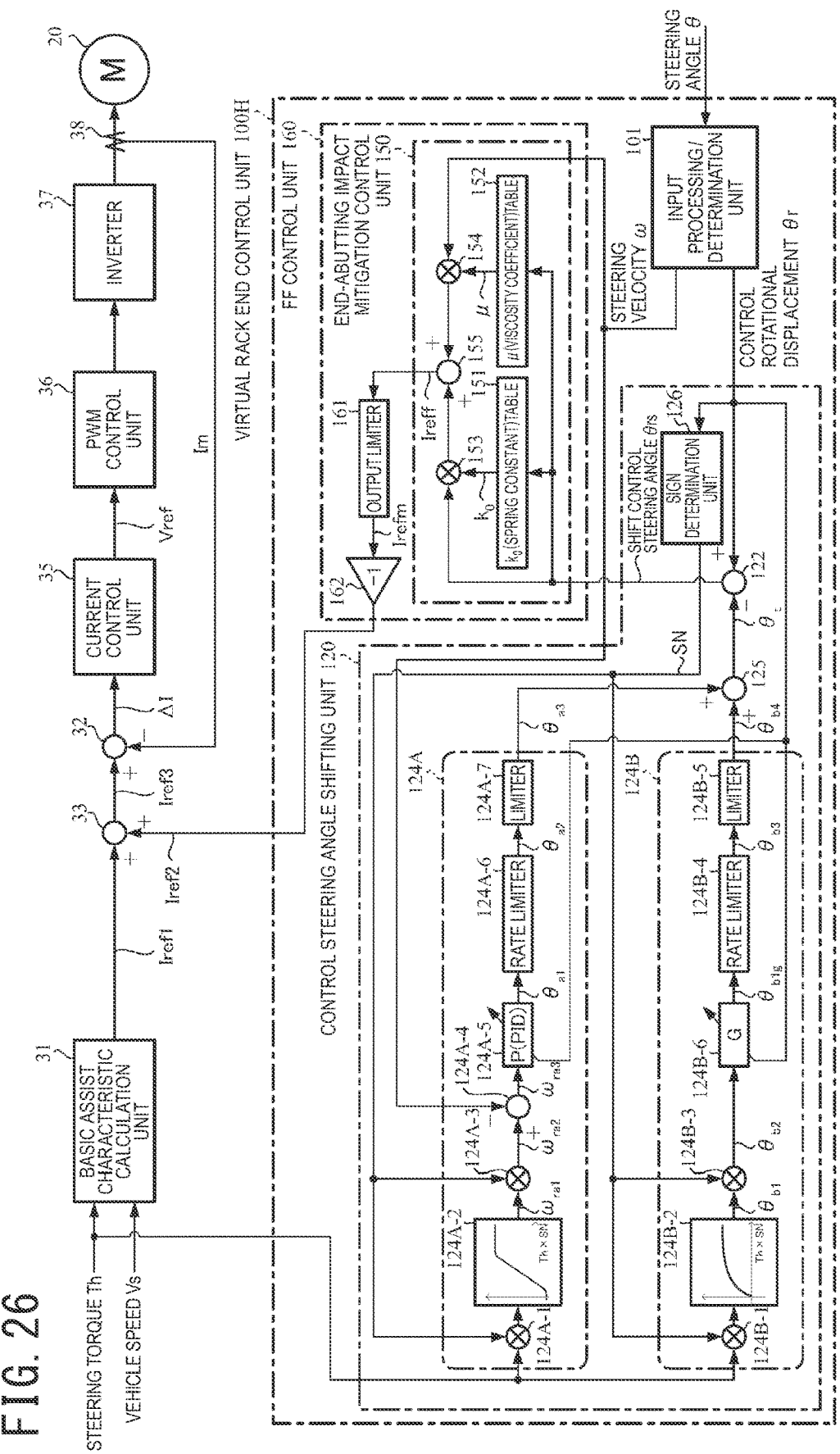
FIG. 26 is a block diagram illustrative of still another configuration example (tenth embodiment) of the present invention.
Figure 27:
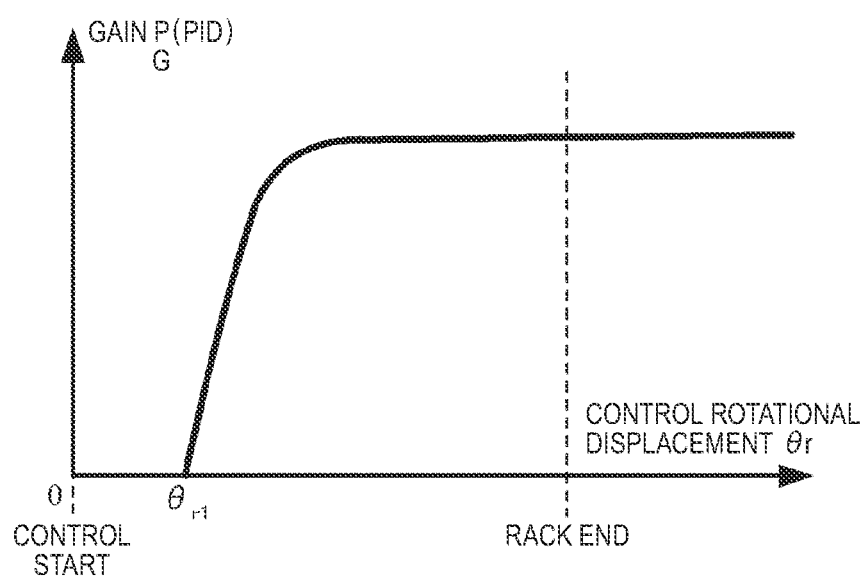
FIG. 27 is a diagram illustrative of an operation example of the tenth embodiment.

Although, in the above-described ninth embodiment, the gain is configured to be variable according to the vehicle speed Vs, it may be configured such that, as illustrated in FIG. 26, the gains of the proportional control unit 124A-5 and the gain unit 124B-6 are variable according to control rotational displacement θr (tenth embodiment). In other words, in the tenth embodiment, a proportional control unit 124A-5 and a gain unit 124B-6 have characteristics that gains thereof respond to control rotational displacement θr. According to the tenth embodiment, it is possible to shift the control rotational displacement only when the control rotational displacement θr approaches a rack end at a predetermined steering angle $θ_{r1}$ or more, as illustrated in FIG. 27. In the tenth embodiment, the arrangement of limiters can also be appropriately changed.

Figure 28A:
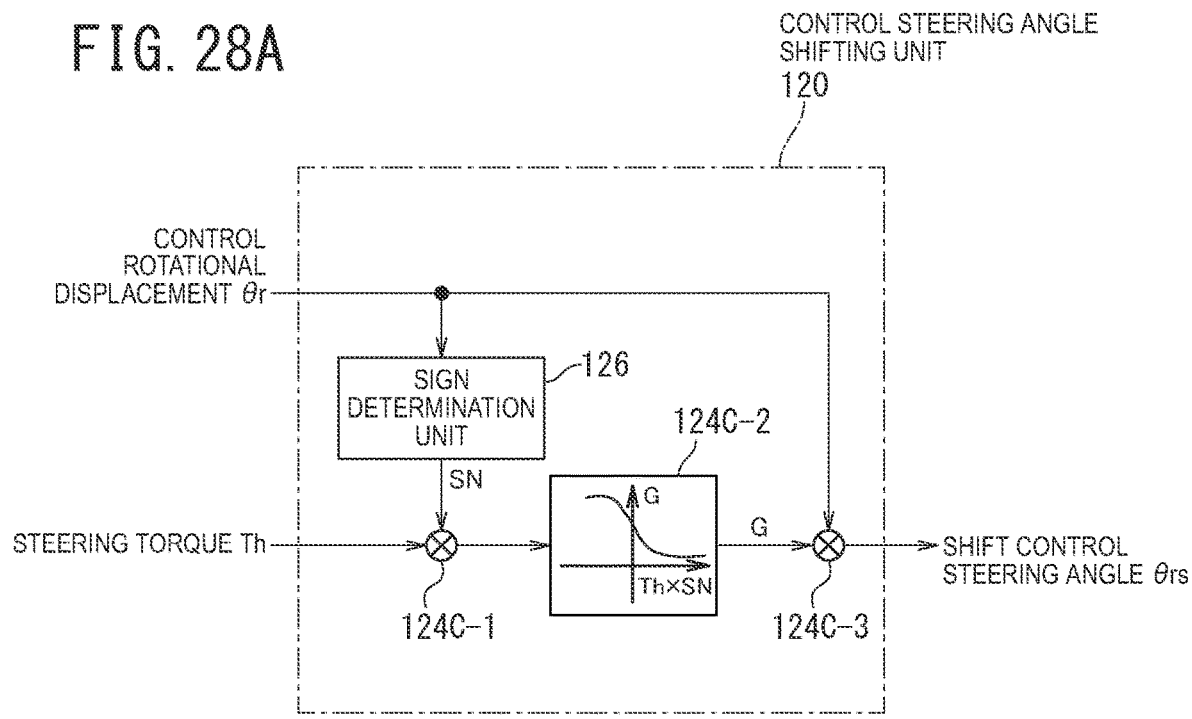
FIG. 28A is a block diagram illustrative of a configuration example of a control steering angle shifting unit 120 of an eleventh embodiment.

FIG. 28A is a block diagram illustrative of a configuration example of a control steering angle shifting unit 120 of an eleventh embodiment. The control steering angle shifting unit 120 may determine a correction gain G, based on a multiplication result (Th×SN) of steering torque Th and a sign SN and calculate a control rotational displacement θr corrected by the correction gain G as a shift control steering angle θrs.

Figure 28B:
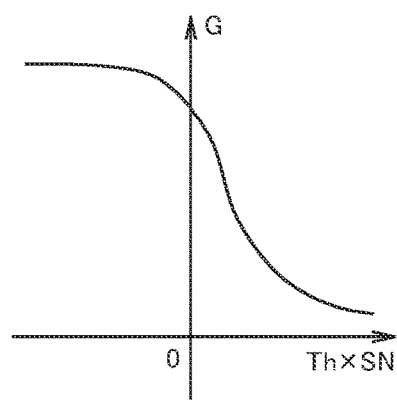
FIG. 28B is a characteristic diagram illustrative of an example of characteristics of a gain setting unit of the control steering angle shifting unit 120.

The control steering angle shifting unit 120 of the eleventh embodiment includes a multiplication unit 124C-1 configured to multiply the steering torque Th by the sign SN, a gain setting unit 124C-2 configured to set gain G in accordance with characteristics as illustrated in FIG. 28B according to a multiplication result (Th×SN) by the multiplication unit 124C-1, and a multiplication unit 124C-3 configured to calculate a shift control steering angle θrs by multiplying the gain G by the control rotational displacement θr. As with the other embodiments, the control steering angle shifting unit 120 of the eleventh embodiment may appropriately include a limiter and a rate limiter configured to limit the gain G and a change rate thereof. The eleventh embodiment also enables the control rotational displacement θr to be reduced and an impact mitigation current command value Ireff to be decreased according to the steering torque Th.

The present invention is also applicable to steer-by-wire in which the steering wheel and a mechanism to turn tires are separated.

REFERENCE SIGNS LIST

1 Steering wheel
2 Column shaft (steering shaft, steering wheel shaft)
10 Torque sensor
12 Vehicle speed sensor
13 Battery
14 Steering angle sensor
20 Motor
30 Control unit (ECU)
31 Basic assist characteristic calculation unit
35 Current control unit
36 PWM control unit
100, 100A to 100F Virtual rack end control unit
101 Input processing/determination unit
120 Control steering angle shifting unit
124A, 124B Shifting steering angle calculation unit
124A-2 Target steering angular velocity calculation unit
124B-2 Steering angle correction amount calculation unit
124C-2 Gain setting unit
124A-6, 124B-4 Rate limiter
124A-7, 124B-5 Limiter
124B-6 Gain unit
126 Sign determination unit
127 Limiter
150 End-abutting impact mitigation control unit
151 $k_0$ (spring constant) table
152 μ (viscosity coefficient) table
160 Feedforward (FF) control unit

The invention claimed is:

1. An electric power steering device performing assist control of a steering system by calculating a first current command value, based on at least steering torque and driving a motor, based on the first current command value, comprising:

a control rotational displacement calculation unit configured to calculate a control rotational displacement when a steering angle of the steering system is in an angular range from a maximum allowable steering angle for the steering system to a predetermined threshold steering angle, the control rotational displacement being a steering angular displacement of the steering angle with the threshold steering angle as a reference;

a feedforward control unit configured to output a second current command value based on a shift control steering angle and a steering velocity in order to suppress impact and abnormal noise at the time of end-abutting at a rack end, and a control steering angle shifting unit configured to calculate the control rotational displacement dynamically corrected by a correction amount based on one of the steering torque and rack axial force and a sign of one of the control rotational displacement and the steering angle as the shift control steering angle in such a way that the absolute value of the shift control steering angle to be decreased for reducing the magnitude of the second current command value, wherein the electric power steering device calculates a third current command value by adding the second current command value to the first current command value and performs the assist control, using the third current command value.

2. The electric power steering device according to claim 1, wherein
the control steering angle shifting unit calculates a target steering angular velocity, based on one of the steering torque and the rack axial force and a sign of one of the control rotational displacement and the steering angle, calculates a first steering angle for shifting from a velocity deviation between the target steering angular velocity and the steering velocity, and calculates the control rotational displacement shifted by the first steering angle for shifting as the shift control steering angle.

3. The electric power steering device according to claim 1, wherein
the control steering angle shifting unit calculates a steering angle correction amount, based on one of the steering torque and the rack axial force and a sign of one of the control rotational displacement and the steering angle, calculates a second steering angle for shifting from the steering angle correction amount, and calculates the control rotational displacement shifted by the second steering angle for shifting as the shift control steering angle.

4. The electric power steering device according to claim 1, wherein
the control steering angle shifting unit determines a correction gain, based on one of the steering torque and the rack axial force and a sign of one of the control rotational displacement and the steering angle and calculates the control rotational displacement corrected by the correction gain as the shift control steering angle.

5. The electric power steering device according to claim 2, wherein
the control steering angle shifting unit includes a first shifting steering angle calculation unit configured to calculate the target steering angular velocity, based on a multiplication result of the steering torque and the sign or a multiplication result of the rack axial force and the sign and calculate the first steering angle for shifting, using at least one of proportional control, integral control, and differential control taking the velocity deviation as input.

6. The electric power steering device according to claim 5, wherein
the first shifting steering angle calculation unit, by limiting an angle for shift calculation calculated using at least one of proportional control, integral control, and differential control taking the velocity deviation as input, using a first limiter, calculates the first steering angle for shifting, and
the first limiter has different characteristics between a positive region and a negative region of the angle for shift calculation.

7. The electric power steering device according to claim 2, wherein
the control steering angle shifting unit calculates the target steering angular velocity, based on a multiplication result of the steering torque and the sign or a multiplication result of the rack axial force and the sign and vehicle speed.

8. The electric power steering device according to claim 5, wherein
the first shifting steering angle calculation unit calculates the first steering angle for shifting, using at least one of proportional control, integral control, and differential control taking the velocity deviation as input and having characteristics responding to vehicle speed.

9. The electric power steering device according to claim 5, wherein
the first shifting steering angle calculation unit calculates the first steering angle for shifting, using at least one of proportional control, integral control, and differential control taking the velocity deviation as input and having characteristics responding to the control rotational displacement.

10. The electric power steering device according to claim 3, wherein
the control steering angle shifting unit includes a second shifting steering angle calculation unit configured to, by limiting the steering angle correction amount calculated based on a multiplication result of the steering torque and the sign or a multiplication result of the rack axial force and the sign, using a second limiter, calculate the second steering angle for shifting.

11. The electric power steering device according to claim 3, wherein
the control steering angle shifting unit calculates the steering angle correction amount, based on a multiplication result of the steering torque and the sign or a multiplication result of the rack axial force and the sign and vehicle speed.

12. The electric power steering device according to claim 3, wherein
the control steering angle shifting unit calculates a second steering angle for shifting from the steering angle correction amount, based on the steering angle correction amount adjusted using gain having characteristics responding to vehicle speed.

13. The electric power steering device according to claim 3, wherein
the control steering angle shifting unit calculates a second steering angle for shifting from the steering angle correction amount, based on the steering angle correction amount adjusted using gain having characteristics responding to the control rotational displacement.

14. The electric power steering device according to claim 1, wherein
the feedforward control unit includes:
an end-abutting impact mitigation control unit including a $k_0$ table configured to calculate a spring constant of the steering system, based on the shift control steering angle, a $\mu$ table configured to calculate a viscosity coefficient of the steering system, based on the shift control steering angle, a first multiplication unit configured to multiply the spring constant by the shift control steering angle, a second multiplication unit configured to multiply the viscosity coefficient by the steering velocity, and an addition unit configured to add a multiplication result by the first multiplication unit to a multiplication result by the second multiplication unit and output an end-abutting impact mitigation current command value; and
an output control unit configured to limit a maximum value of the end-abutting impact mitigation current command value, invert the limited end-abutting impact mitigation current command value, and output the second current command value.

15. The electric power steering device according to claim 1, wherein
the feedforward control unit includes:
an end-abutting impact mitigation control unit including a $k_0$ table configured to calculate a spring constant of the steering system, based on the shift control steering angle, a $\mu$ table configured to calculate a viscosity coefficient of the steering system, based on the control rotational displacement, a first multiplication unit configured to multiply the spring constant by the shift control steering angle, a second multiplication unit configured to multiply the viscosity coefficient by the steering velocity, and an addition unit configured to add a multiplication result by the first multiplication unit to a multiplication result by the second multiplication unit and output an end-abutting impact mitigation current command value; and
an output control unit configured to limit a maximum value of the end-abutting impact mitigation current command value, invert the limited end-abutting impact mitigation current command value, and output the second current command value.

\* \* \* \* \*